US012595884B2

(12) United States Patent
Minas

(10) Patent No.: US 12,595,884 B2
(45) Date of Patent: Apr. 7, 2026

(54) METHODS, APPARATUS, SYSTEMS, AND ARTICLES OF MANUFACTURE TO PRODUCE CRYO-COMPRESSED HYDROGEN

(71) Applicant: General Electric Company, Schenectady, NY (US)

(72) Inventor: Constantinos Minas, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 532 days.

(21) Appl. No.: 17/961,326

(22) Filed: Oct. 6, 2022

(65) Prior Publication Data

US 2024/0118023 A1 Apr. 11, 2024

(51) Int. Cl.
*F17C 5/00* (2006.01)
*F17C 5/06* (2006.01)

(52) U.S. Cl.
CPC ........ *F17C 5/06* (2013.01); *F17C 2205/0338* (2013.01); *F17C 2221/012* (2013.01); *F17C 2223/0123* (2013.01); *F17C 2223/035* (2013.01); *F17C 2225/0115* (2013.01); *F17C 2225/036* (2013.01); *F17C 2227/0157* (2013.01); *F17C 2227/0341* (2013.01); *F17C 2227/0348* (2013.01); *F17C 2227/036* (2013.01); *F17C 2227/0388* (2013.01); *F17C 2250/032* (2013.01); *F17C 2250/0626* (2013.01); *F17C 2250/0631* (2013.01); *F17C 2265/061* (2013.01); *F17C 2270/0189* (2013.01); *F25J 2230/04* (2013.01)

(58) Field of Classification Search
CPC .......................... F17C 5/06; F17C 2270/0189
See application file for complete search history.

(56) References Cited

U.S. PATENT DOCUMENTS

| | | | |
|---|---|---|---|
| 8,650,195 | B2 | 2/2014 | Pedersen |
| 9,676,491 | B2 | 6/2017 | Epstein et al. |

(Continued)

FOREIGN PATENT DOCUMENTS

| | | |
|---|---|---|
| CN | 113202632 | 8/2021 |
| EP | 2923948 | 9/2015 |
| EP | 3885267 | 9/2021 |

OTHER PUBLICATIONS

European Patent Office, "Extended European Search Report," issued in connection with European Patent Application No. 23167859.0, dated Mar. 11, 2024, 9 pages.

(Continued)

*Primary Examiner* — Brian M King
(74) *Attorney, Agent, or Firm* — Hanley, Flight & Zimmerman, LLC

(57) ABSTRACT

Methods, apparatus, systems, and articles of manufacture to produce cryo-compressed hydrogen are disclosed. An example cryo-compressed hydrogen production system includes a compressor to compress an input of hydrogen, at least one heat exchanger to cool the hydrogen, and a conduit to convey the hydrogen at least partially to a storage tank for storage at a temperature less than or equal to a first threshold and greater than a second threshold, the first threshold defined by an upper temperature limit for cryo-compressed hydrogen, the second threshold defined by a hydrogen liquefaction temperature.

20 Claims, 12 Drawing Sheets

(56) References Cited

U.S. PATENT DOCUMENTS

| | | | | |
|---|---|---|---|---|
| 10,247,358 | B2 | 4/2019 | Allidieres | |
| 10,427,772 | B2 | 10/2019 | Fournier et al. | |
| 10,800,525 | B2 | 10/2020 | Sankrithi et al. | |
| 2005/0248154 | A1* | 11/2005 | Huston | F16L 15/003 285/333 |
| 2005/0284154 | A1 | 12/2005 | Peter et al. | |
| 2013/0266505 | A1 | 10/2013 | Bauch et al. | |
| 2014/0026597 | A1 | 1/2014 | Epstein et al. | |
| 2014/0091574 | A1* | 4/2014 | Favy | F02C 6/16 137/209 |
| 2017/0059089 | A1* | 3/2017 | Uchida | F17C 5/06 |
| 2019/0170299 | A1* | 6/2019 | Hettenkofer | F17C 5/06 |
| 2022/0205591 | A1* | 6/2022 | Li | F17C 5/04 |
| 2022/0221220 | A1* | 7/2022 | Thomas | F25J 1/001 |

OTHER PUBLICATIONS

European Patent Office, "Communication pursuant to Rule 69 EPC," issued in connection with European Patent Application No. 23167859.0, dated Apr. 15, 2024, 2 pages.

* cited by examiner

METHODS, APPARATUS, SYSTEMS, AND ARTICLES OF MANUFACTURE TO PRODUCE CRYO-COMPRESSED HYDROGEN

FIELD OF THE DISCLOSURE

This disclosure relates generally to fuel production systems and, more particularly, to systems to produce cryo-compressed hydrogen.

BACKGROUND

In recent years, hydrogen-powered vehicles (e.g., automotives, aircraft, buses, ships, etc.) have become more prevalent. As such, advancements in hydrogen storage tanks and refueling measures for such tanks are ever increasing. A typical liquid hydrogen refueling system includes a supply tank and/or trailer, a flow control valve, a volumetric flowmeter, a cryogenic valve, and vacuum jacketed flowlines. Along with the onboard liquid hydrogen tank(s), some hydrogen-powered vehicles (e.g., aircraft) include a cryogenic pump or other mechanism(s) to supply gaseous hydrogen to engine(s) for combustion and power generation. Some hydrogen-powered vehicles include onboard cryo-compressed hydrogen tank(s) to store hydrogen in a supercritical state (e.g., supercritical gas) at pressures higher than liquid hydrogen tanks but at similar densities.

BRIEF DESCRIPTION OF THE DRAWINGS

A full and enabling disclosure of the preferred embodiments, including the best mode thereof, directed to one of ordinary skill in the art, is set forth in the specification, which makes reference to the appended Figures, in which.

The figures are not to scale. In general, the same reference numbers will be used throughout the drawing(s) and accompanying written description to refer to the same or like parts.

DETAILED DESCRIPTION

Figure 1:
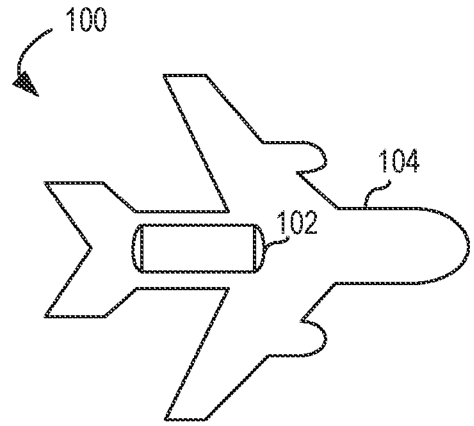
FIG. 1 illustrates an example positioning of a hydrogen-based fuel distribution system in an aircraft.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

In some examples used herein, "upstream" and "downstream" refer to the relative direction with respect to fluid flow in a fluid pathway. The term "upstream" refers to the direction from which the fluid flows, and "downstream" refers to the direction to which the fluid flows. For example, if a system includes a pump and a flowmeter, and the flowmeter measures a flowrate of fluid exiting the pump, then the flowmeter is downstream of the pump, and the pump is upstream of the flowmeter.

Hydrogen-based fuel systems can be utilized to supply hydrogen as fuel for combustion in engines. As a result, the combustion in the engines can help produce power and/or mechanical drive for aeronautics, marine applications, gear boxes, offshore power generators, terrestrial power plants, etc., with increased efficiency and reduced carbon emissions compared to engines that utilize hydrocarbons.

Typical hydrogen-based fuel systems include a storage of liquid hydrogen as liquid hydrogen storage tanks are lighter than tanks filled with gaseous hydrogen due to the reduced volume needed to store the same mass of hydrogen in a liquid state. However, the liquid hydrogen needs to be converted back to a gaseous state in advance of combustion for operation of the engine. Thus, the liquid hydrogen undergoes different processes for conversion to the gaseous state in advance of combustion. As such, the conversion processes result in more complex fuel systems and additional components, which can increase a weight of a vehicle (e.g., an aircraft) and reduce fuel efficiency in addition to limiting a rate at which fuel flow adjustments can be obtained in the fuel system. Moreover, difficulties associated with causing the hydrogen to reach liquid temperatures results in liquid hydrogen production systems being unable to convert an entire input of hydrogen to the liquid state and, instead, requires at least a portion of the input to run through the liquid conversion process more than once.

Example cryo-compressed hydrogen production systems disclosed herein produce cryo-compressed hydrogen for utilization in hydrogen-based fuel systems. The example systems can be implemented or installed at a location where the produced cryo-compressed hydrogen is supplied directly to a cryogenic vessel on an aircraft and/or other vehicles. For example, the systems disclosed herein can be installed at a facility (e.g., at an airport) to eliminate or otherwise reduce transportation difficulties associated with cryo-compressed hydrogen. Further, the example systems produce the cryo-compressed hydrogen at the same density as liquid hydrogen (e.g., 64.245 kilograms per meter cubed (kg/m$^3$)) to enable the same mass of cryo-compressed hydrogen to be stored in a same size storage vessel as the liquid hydrogen. Moreover, by providing the cryo-compressed hydrogen directly to a cryogenic vessel aboard an aircraft or other vehicle, the production system reduces the processing of the hydrogen to be performed in preparation for combustion. For example, the usage of liquid hydrogen pumps can be eliminated given that cryo-compressed hydrogen is already compressed. As a result, hydrogen gas can be delivered to a combustor at a required pressure by pressure-driven flow.

Additionally, conversion of hydrogen to the cryo-compressed state as opposed to the liquid state enables the hydrogen to be produced with increased energy efficiency as well as fewer and simpler components. For example, an entire input of gaseous hydrogen can be converted to the cryo-compressed state with one pass through the example system. In contrast, liquid hydrogen production systems reroute hydrogen that is not converted to the liquid state at the end of the production cycle back towards the starting point of the system.

Further, the cryo-compressed hydrogen production system can produce the cryo-compressed hydrogen with fewer and simpler heat exchangers compared to liquid hydrogen production systems. For example, heat exchangers of the cryo-compressed hydrogen production system include at most two fluids. On the other hand, heat exchangers of the liquid hydrogen production systems utilize three-fluid heat exchangers.

In some circumstances, by not utilizing certain components utilized by liquid hydrogen production systems, the cryo-compressed hydrogen production system eliminates an error risk factor associated with such components and, thus, reduces a likelihood of an error occurring during production. Advantageously, production of a certain mass of cryo-compressed hydrogen with the cryo-compressed hydrogen production system saves between 200-1,300 kilojoules per kilogram (kJ/kg) of energy compared to the production of the same mass of liquid hydrogen with the liquid hydrogen production systems.

For the figures disclosed herein, identical numerals indicate the same elements throughout the figures. The example illustration of FIG. 1 is a diagram 100 representing positioning of a cryogenic vessel 102 on an aircraft 104. For example, the cryogenic vessel 102 can be implemented in a hydrogen-based fuel distribution system to supply cryo-compressed hydrogen to an engine of the aircraft 104 as fuel for combustion. Although the aircraft 104 shown in FIG. 1 is an airplane, the examples described herein may also be applicable to other fixed-wing aircraft, including unmanned aerial vehicles (UAV), and/or any type of non-aircraft-based application (e.g., watercraft, road-based vehicles, trains, etc.).

Figure 2:
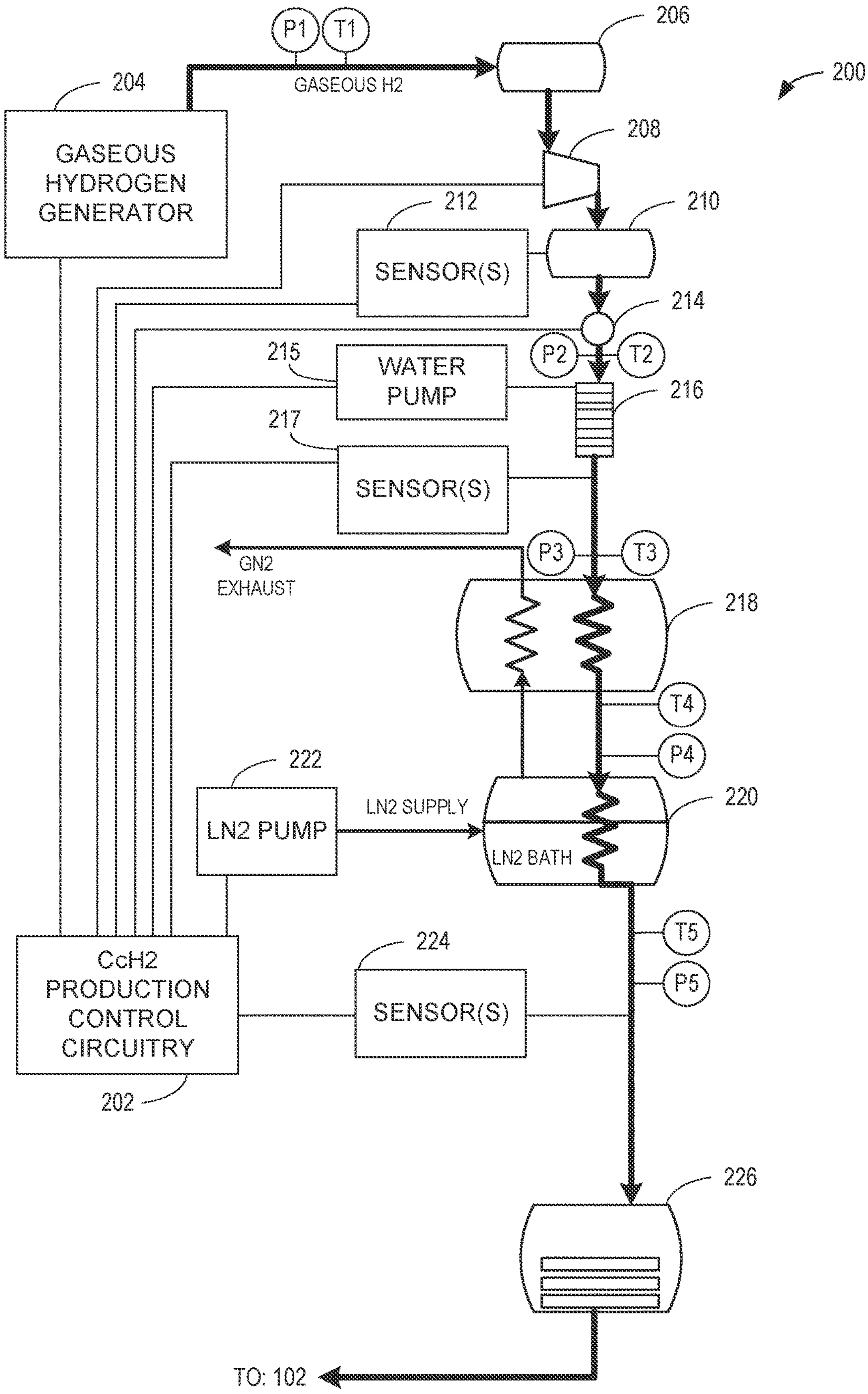
FIG. 2 schematically illustrates an example cryo-compressed hydrogen production system disclosed herein to supply the hydrogen-based fuel distribution system of FIG. 1.

FIG. 2 schematically illustrates a cryo-compressed hydrogen production system 200 to form cryo-compressed hydrogen. As such, the cryo-compressed hydrogen production system 200 can generate cryo-compressed hydrogen for storage in the cryogenic vessel 102 of FIG. 1 and utilization in an associated hydrogen-based fuel distribution system in the aircraft 104 of FIG. 1. Additionally or alternatively, the cryo-compressed hydrogen production system 200 can generate cryo-compressed hydrogen to serve as a combusting fuel in other vehicles and/or power generators.

In the illustrated example of FIG. 2, the cryo-compressed hydrogen production system 200 includes cryo-compressed hydrogen production control circuitry 202, a hydrogen input generator 204 (e.g., an electrolyzer, a steam methane reformer (SMR), etc.), one or more hydrogen conduit(s) 205 (e.g., pipes, ducts, channels, etc.), a first buffer tank 206, a compressor 208, a second buffer tank 210, one or more first sensor(s) 212 (e.g., at least one pressure sensor, temperature sensor, etc.), a valve 214, a water pump 215, a first heat exchanger 216, one or more second sensor(s) 217 (e.g., at least one pressure sensor, temperature sensor, etc.), a second heat exchanger 218, a third heat exchanger 220, a liquid nitrogen (LN2) pump 222, one or more third sensor(s) 224 (e.g., at least one temperature sensor, a pressure sensor, etc.), and a catalyst 226.

The cryo-compressed hydrogen production control circuitry 202 of FIG. 2 may be instantiated (e.g., creating an instance of, bring into being for any length of time, materialize, implement, etc.) by processor circuitry such as a central processing unit executing instructions. Additionally or alternatively, the cryo-compressed hydrogen production control circuitry 202 of FIG. 2 may be instantiated (e.g., creating an instance of, bring into being for any length of time, materialize, implement, etc.) by an ASIC or an FPGA structured to perform operations corresponding to the instructions. It should be understood that some or all of the cryo-compressed hydrogen production control circuitry 202 may, thus, be instantiated at the same or different times. Some or all of the cryo-compressed hydrogen production control circuitry 202 may be instantiated, for example, in one or more threads executing concurrently on hardware and/or in series on hardware. Moreover, in some examples, some or all of the cryo-compressed hydrogen production control circuitry 202 may be implemented by microprocessor circuitry executing instructions to implement one or more virtual machines and/or containers. In the illustrated example of FIG. 2, the cryo-compressed hydrogen production control circuitry 202 is in communication with the hydrogen input generator 204, the compressor 208, the first sensor(s) 212, the valve 214, the water pump 215, the second sensor(s) 217, the LN2 pump 222, and/or the third sensor(s) 224.

In the illustrated example of FIG. 2, the hydrogen conduit(s) 205 is positioned in and/or is in fluid connection with (e.g., fluidly coupled to) the hydrogen input generator 204, the first buffer tank 206, the compressor 208, the second buffer tank 210, the first heat exchanger 216, the second heat exchanger 218, the third heat exchanger 220, the catalyst 226, and the cryogenic vessel 102. Further, the first sensor(s) 212, the valve 214, the second sensor(s) 217, and/or the third sensor(s) 224 are operatively coupled to the hydrogen conduit(s) 205. In particular, the first buffer tank 206 is fluidly coupled to the hydrogen conduit(s) 205 downstream of the hydrogen input generator 204. The compressor 208 is fluidly coupled to the hydrogen conduit(s) 205 downstream of the first buffer tank 206. The second buffer tank 210 is fluidly coupled to the hydrogen conduit(s) 205 downstream of the compressor 208. The first sensor(s) 212 is operatively coupled to the second buffer tank 210 and/or the hydrogen conduit(s) 205 to measure a pressure and/or a temperature of the hydrogen downstream of the compressor 208. The valve 214 is operatively coupled to the hydrogen conduit(s) 205 downstream of the second buffer tank 210. The first heat exchanger 216 is fluidly coupled to the hydrogen conduit(s) 205 downstream of the valve 214. The second sensor(s) 217 is operatively coupled to the hydrogen conduit(s) 205 downstream of the first heat exchanger 216 to measure a temperature and/or a pressure of the hydrogen that the first heat exchanger 216 outputs. The second heat exchanger 218 is fluidly coupled to the hydrogen conduit(s) 205 downstream of the first heat exchanger 216. The third heat exchanger 220 is fluidly coupled to the hydrogen conduit(s) 205 downstream of the second heat exchanger 218. The third sensor(s) 224 is operatively coupled to the hydrogen conduit(s) 205 to measure a temperature of the hydrogen downstream of the third heat exchanger 220. The catalyst 226 is fluidly coupled to the hydrogen conduit(s) 205 downstream of the third heat exchanger 220. The cryogenic vessel 102 is fluidly coupled to the hydrogen conduit(s) 205 downstream of the catalyst 226.

The cryo-compressed hydrogen production system 200 of FIG. 2 includes the hydrogen input generator 204 to produce an input of hydrogen that the cryo-compressed hydrogen production system 200 converts to a cryo-compressed state. Specifically, the hydrogen input generator 204 produces hydrogen, and the hydrogen conduit(s) 205 transport the produced hydrogen to the first buffer tank 206. In some examples, the hydrogen that the hydrogen input generator 204 produces is in a gaseous state. Alternatively, the hydrogen that the hydrogen input generator 204 produces can be in any other non-liquid state. In FIG. 2, the hydrogen input generator 204 causes the produced hydrogen to have a first pressure P1 (e.g., 20 bar) and a first temperature T1 (e.g., 300 Kelvin (K)). However, it should be understood that the hydrogen input generator 204 can cause the hydrogen input to have any suitable pressure and/or temperature. Accordingly, as used herein, an "input of hydrogen" can have any pressure greater than 0.01 bar and any temperature greater than 13.8K. In FIG. 2, the cryo-compressed hydrogen production control circuitry 202 controls a rate at which the hydrogen is produced by the hydrogen input generator hydrogen input generator 204. As such, the cryo-compressed hydrogen production control circuitry 202 can adjust a flow rate of the hydrogen in the hydrogen conduit(s) 205 through control of the hydrogen input generator 204. For example, the cryo-compressed hydrogen production control circuitry 202 can modulate a power and/or a flow of water delivered to the hydrogen input generator 204 to control an output flow rate of the hydrogen.

The cryo-compressed hydrogen production system 200 of FIG. 2 includes the compressor 208 to increase a pressure of the produced hydrogen. Specifically, the compressor 208 causes the pressure of the hydrogen to increase from the first pressure P1 to a second pressure P2 (e.g., 350 bar, 450 bar, 550 bar, etc.). Additionally, as a byproduct of increasing the pressure, the compressor 208 causes the temperature of the hydrogen to increase from the first temperature T1 to a second temperature T2 (e.g., 680 K, 720 K, 760 K, etc.). In some examples, the compressor 208 is implemented by a multi-stage diaphragm compressor and/or a multi-stage piston compressor. In the illustrated example of FIG. 2, the cryo-compressed hydrogen production control circuitry 202 can determine the second pressure P2 that the compressor 208 is to cause the hydrogen to reach based on a desired output pressure for the cryo-compressed hydrogen production system 200 and a predetermined pressure loss associated with the first heat exchanger 216, the second heat exchanger 218, and the third heat exchanger 220. Specifically, the cryo-compressed hydrogen production control circuitry 202 determines the second pressure P2 at which the hydrogen is to be provided to the first heat exchanger 216 based on a sum of the desired output pressure and the predetermined pressure loss associated with the heat exchangers 216, 218, 220.

In some examples, the cryo-compressed hydrogen production system 200 of FIG. 2 includes the second buffer tank 210 and the valve 214 positioned downstream of the compressor 208 to help control a pressure of the hydrogen that enters the first heat exchanger 216. In such examples, the compressor 208 increases the pressure of the hydrogen in the second buffer tank 210. For example, the cryo-compressed hydrogen production control circuitry 202 can cause the valve 214 to be in a closed position in response to the first sensor(s) 212 measuring a pressure in the second buffer tank 210 that does not satisfy (e.g., is less than) a pressure threshold (e.g., the sum of the desired output pressure and the pressure loss associated with the heat exchangers 216, 218, 220). In such examples, in response to the first sensor(s) 212 measuring a pressure that satisfies the pressure threshold, the cryo-compressed hydrogen production control circuitry 202 can cause the valve 214 to open. In turn, the hydrogen can flow towards the first heat exchanger 216 at the second pressure P2. In some examples, the cryo-compressed hydrogen production control circuitry 202 modulates the position of the valve 214 to help maintain the hydrogen in the second buffer tank 210 at a pressure that satisfies the pressure threshold. In some examples, the second buffer tank 210, the first sensor(s) 212, and the valve 214 are implemented in a compressor system that includes the compressor 208.

In some examples, the cryo-compressed hydrogen production control circuitry 202 controls the flow rate of the hydrogen that the hydrogen input generator 204 outputs to enable the compressor 208 to compress the hydrogen to a pressure that satisfies the pressure threshold. In some examples, the cryo-compressed hydrogen production control circuitry 202 controls a power input provided to the compressor 208 to cause the compressor 208 to output the hydrogen at the second pressure P2. Further, in such examples, the cryo-compressed hydrogen production control circuitry 202 maintains the valve 214 in a fully open position to enable an increased flow rate of the hydrogen and, thus, an increased rate of production of the cryo-compressed hydrogen. Alternatively, in such examples, the cryo-compressed hydrogen production system 200 may not include the second buffer tank 210 and/or the valve 214.

The cryo-compressed hydrogen production system 200 of FIG. 2 includes the first heat exchanger 216 to cause the hydrogen to encounter a first temperature reduction. Specifically, the first heat exchanger 216 can reduce the temperature of the hydrogen from the second temperature T2 to a third temperature T3 (e.g., 275 K, 300 K, 325 K, etc.) less than the second temperature T2. Additionally, the first heat exchanger 216 causes the hydrogen to encounter a first pressure drop from the second pressure P2 to a third pressure P3 (e.g., 340 bar, 440 bar, 540 bar, etc.) less than the second pressure P2. In the illustrated example of FIG. 2, the first heat exchanger 216 is a water/hydrogen heat exchanger (e.g., a plate heat exchanger, a variable conductance heat pipe (VCHP) heat exchanger, a printed circuit heat exchanger, etc.) in which the water cools the hydrogen to the third temperature T3.

The cryo-compressed hydrogen production system 200 of FIG. 2 includes the water pump 215 to pump water through the first heat exchanger 216. The cryo-compressed hydrogen production control circuitry 202 controls an output of the water pump 215 based on a temperature and/or a pressure that the second sensor(s) 217 measure. For example, the cryo-compressed hydrogen production control circuitry 202 controls a mass flow rate of water that the water pump 215 pumps into the first heat exchanger 216 to control thermal energy that the water absorbs from the hydrogen in the first heat exchanger 216. As such, the cryo-compressed hydrogen production control circuitry 202 controls a temperature of the hydrogen output from the first heat exchanger 216 (e.g., the third temperature T3). In the illustrated example of FIG. 2, the cryo-compressed hydrogen production control circuitry 202 causes the third temperature T3 to be within 5 K of a temperature of the water that the water pump 215 drives into the first heat exchanger 216. Specifically, the cryo-compressed hydrogen production control circuitry 202 causes the water pump 215 to adjust (e.g., increase) the mass flow rate of the water in response to the second sensor(s) 217 measuring a temperature more than 5 K greater than the temperature of the water.

The cryo-compressed hydrogen production system 200 of FIG. 2 includes the second heat exchanger 218 to cause the hydrogen to encounter a second temperature reduction. Specifically, the second heat exchanger 218 reduces the temperature of the hydrogen from the third temperature T3 to a fourth temperature T4 (e.g., 175 K, 200 K, 225 K, etc.) less than the third temperature T3. Additionally, the second heat exchanger 218 causes the hydrogen to encounter a second pressure drop from the third pressure P3 to a fourth pressure P4 (e.g., 330 bar, 430 bar, 530 bar, etc.) less than the third pressure P3. In FIG. 2, the second heat exchanger 218 is implemented by a nitrogen/hydrogen heat exchanger.

The cryo-compressed hydrogen production system 200 of FIG. 2 includes the third heat exchanger 220 to cause the hydrogen to encounter a third temperature reduction. Specifically, the third heat exchanger 220 reduces the temperature of the hydrogen from the fourth temperature T4 to a fifth temperature T5 (e.g., 80 K, 90 K, 100 K, etc.) less than the fourth temperature T4. Additionally, the third heat exchanger 220 causes the hydrogen to encounter a third pressure drop from the fourth pressure P4 to a fifth pressure P5 (e.g., 300 bar, 400 bar, 500 bar, etc.) less than the fourth pressure P4. Although the hydrogen encounters pressure drops as a result of flowing through the first, second, and third heat exchangers 216, 218, 220, in some examples, the hydrogen approximately maintains (e.g., within 15% of, within 20% of, etc.) the second pressure P2 produced by the compressor 208 throughout the cryo-compressed hydrogen production system 200.

In the illustrated example of FIG. 2, the third heat exchanger 220 causes the hydrogen to reach a cryo-compressed state (e.g., become cryo-compressed hydrogen). In FIG. 2, the third heat exchanger 220 is implemented by a liquid nitrogen bath in which the liquid nitrogen cools the flowing hydrogen. In FIG. 2, the LN2 pump 222 pumps the liquid nitrogen into the third heat exchanger 220 to fill the liquid nitrogen bath. Further, as the temperature difference between the liquid nitrogen and the hydrogen flowing through the third heat exchanger 220 causes the liquid nitrogen to encounter a phase change from a liquid to a gaseous state, the LN2 pump 222 can continue to pump the liquid nitrogen into the third heat exchanger 220. Moreover, the nitrogen that converts to the gaseous state flows through the second heat exchanger 218 to help produce the second temperature reduction before being discharged.

In FIG. 2, the cryo-compressed hydrogen production control circuitry 202 controls an output of the LN2 pump 222 based on a temperature and/or a pressure of the hydrogen measured downstream of the third heat exchanger 220. Specifically, the cryo-compressed hydrogen production control circuitry 202 controls the LN2 pump 222 to cause the hydrogen to convert to a cryo-compressed state in response to flowing through the second and third heat exchangers 218, 220. For example, the third sensor(s) 224 can measure the temperature and/or the pressure of the hydrogen downstream of the third heat exchanger 220. In response to the temperature of the hydrogen not satisfying (e.g., being greater than) a temperature threshold (e.g., 80 K, 90 K, 100 K, etc.), the cryo-compressed hydrogen production control circuitry 202 can cause the LN2 pump 222 to increase a mass flow rate output of the liquid nitrogen to increase the second and third temperature reductions caused by the second and third heat exchangers 218, 220. Additionally or alternatively, in response to the pressure of the hydrogen not satisfying (e.g., being less than) a pressure threshold (e.g., 350 bar, 425 bar, 497 bar, etc.), the cryo-compressed hydrogen production control circuitry 202 can cause the LN2 pump 222 to reduce a mass flow rate output of the liquid nitrogen to reduce the second and third pressure drops caused by the second and third heat exchangers 218, 220.

The cryo-compressed hydrogen production system 200 of FIG. 2 includes the catalyst 226 to convert orthohydrogen in the cryo-compressed hydrogen to parahydrogen. Specifically, both nuclei of orthohydrogen molecules spin in the same direction while both nuclei of parahydrogen molecules spin in opposite directions. The opposing spin of the nuclei in parahydrogen reduces an internal energy of the hydrogen molecule and causes the hydrogen molecule to become more stable. As a result, the catalyst 226 stabilizes the cryo-compressed hydrogen. In some examples, a portion of the orthohydrogen in the cryo-compressed hydrogen is converted to parahydrogen, which reduces a duty of the catalyst 226 and enables the catalyst 226 to function for a longer duration before replacement is necessary. For example, when the cryo-compressed hydrogen has a temperature of 80K, the catalyst 226 converts 32% of the orthohydrogen to parahydrogen. Further, when the cryo-compressed hydrogen has a temperature of 40K, the catalyst 226 converts 83% of the orthohydrogen to parahydrogen. On the other hand, with liquid hydrogen, 98.7% of the orthohydrogen is converted to parahydrogen, which requires more time and reduces a lifespan of the catalyst 226. In the illustrated example of FIG. 2, the hydrogen conduit(s) 205 downstream of the catalyst 226 can transport and store the stabilized cryo-compressed hydrogen in the cryogenic vessel 102 of FIG. 1.

Figure 3:
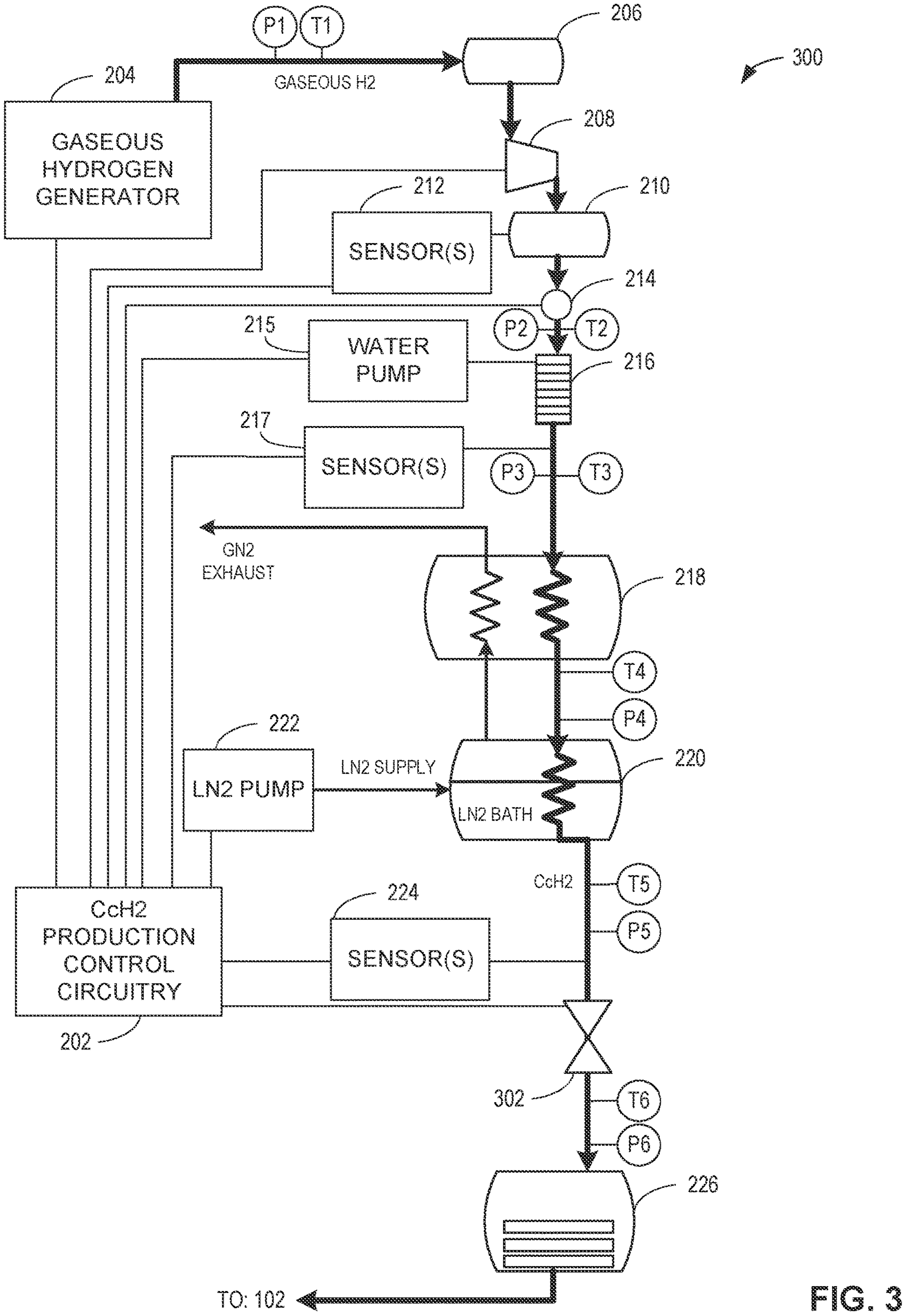
FIG. 3 schematically illustrates another example cryo-compressed hydrogen production system disclosed herein to supply the hydrogen-based fuel distribution system of FIG. 1.

FIG. 3 schematically illustrates another example cryo-compressed hydrogen production system 300 to supply cryo-compressed hydrogen to the cryogenic vessel 102 aboard the aircraft 104 of FIG. 1. In the illustrated example of FIG. 3, the cryo-compressed hydrogen production system 300 includes the cryo-compressed hydrogen production control circuitry 202, the hydrogen input generator 204, the hydrogen conduit(s) 205, the first buffer tank 206, the compressor 208, the second buffer tank 210, the first sensor(s) 212, the valve 214, the water pump 215, the first heat exchanger 216, the second sensor(s) 217, the second heat exchanger 218, the third heat exchanger 220, the LN2 pump 222, the third sensor(s) 224, and the catalyst 226. Additionally, the cryo-compressed hydrogen production system 300 includes an expansion valve 302 in fluid connection with the hydrogen conduit(s) 205 downstream of the third heat exchanger 220 and upstream of the catalyst 226.

The cryo-compressed hydrogen production system 300 of FIG. 3 includes the expansion valve 302 to cause the hydrogen to encounter a fourth temperature reduction. Specifically, the expansion valve 302 reduces the temperature of the hydrogen from the fifth temperature T5 to a sixth temperature T6 (e.g., 34 K, 40K, 46K, etc.) less than the fifth temperature T5. Additionally, the expansion valve 302 causes the hydrogen to encounter a fourth pressure drop from the fifth pressure P5 to a sixth pressure P6 (e.g., 65 bar, 100 bar, 135 bar, etc.) less than the fifth pressure P5. As a result, the expansion valve 302 enables the produced cryo-compressed hydrogen to be stored in cryogenic vessels (e.g., the cryogenic vessel 102 of FIG. 1) that have relatively lower pressure capacities (e.g., pressure capacities of 65 bar, 100 bar, 135 bar, etc.) compared to the cryogenic vessels supplied by the cryo-compressed hydrogen production system 200 of FIG. 2.

Figure 4:
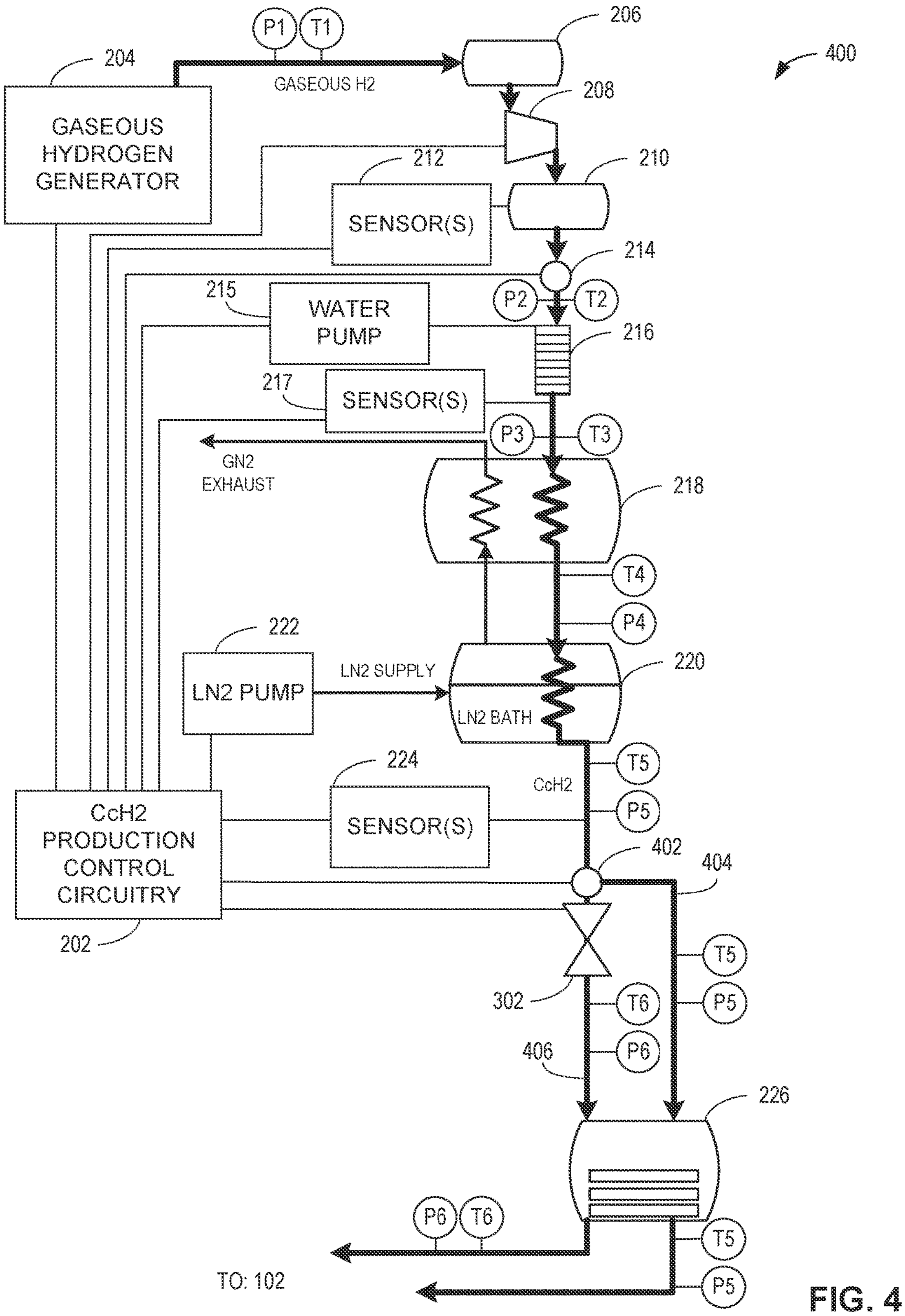
FIG. 4 schematically illustrates another example cryo-compressed hydrogen production system disclosed herein to supply the hydrogen-based fuel distribution system of FIG. 1.

FIG. 4 schematically illustrates another example cryo-compressed hydrogen production system 400 to supply cryo-compressed hydrogen to the cryogenic vessel 102 aboard the aircraft 104 of FIG. 1. In the illustrated example of FIG. 4, the cryo-compressed hydrogen production system 400 includes the cryo-compressed hydrogen production control circuitry 202, the hydrogen input generator 204, the hydrogen conduit(s) 205, the first buffer tank 206, the compressor 208, the second buffer tank 210, the first sensor(s) 212, the valve 214, the water pump 215, the first heat exchanger 216, the second sensor(s) 217, the second heat exchanger 218, the third heat exchanger 220, the LN2 pump 222, the third sensor(s) 224, the expansion valve 302, and the catalyst 226. Additionally, the cryo-compressed hydrogen production system 300 includes a flow direction control valve 402 operatively coupled to the hydrogen conduit(s) 205 downstream of the third heat exchanger 220 and upstream of the expansion valve 302. In FIG. 4, the cryo-compressed hydrogen production control circuitry 202 is operatively coupled to the flow direction control valve 402.

The cryo-compressed hydrogen production system 400 of FIG. 4 includes the flow direction control valve 402 to direct a flow of the cryo-compressed hydrogen through a first portion 404 of the hydrogen conduit(s) 205 or a second portion 406 of the hydrogen conduit(s) 205. Specifically, the expansion valve 302 is operatively coupled to the second portion 406 of the hydrogen conduit(s) 205 such that the cryo-compressed hydrogen that flows through the second portion 406 of the hydrogen conduit(s) 205 encounters the fourth temperature reduction from the fifth temperature T5 to the sixth temperature T6 as well as the fourth pressure drop from the fifth pressure P5 to the sixth pressure P6. The first portion 404 of the hydrogen conduit(s) 205 enables the cryo-compressed hydrogen to avoid the expansion valve 302 and, thus, remain at the fifth temperature T5 and the fifth pressure P5.

As such, the flow direction control valve 402 can guide the cryo-compressed hydrogen through the first portion 404 of the hydrogen conduit(s) 205 in response to the cryogenic vessel 102 in fluid connection with the hydrogen conduit(s) 205 downstream of the catalyst 226 having a pressure capacity that satisfies (e.g., is greater than) a pressure capacity threshold (e.g., 300 bar, 350 bar, 400 bar, etc.). Further, the flow direction control valve 402 can guide the cryo-compressed hydrogen through the second portion 406 of the hydrogen conduit(s) 205 in response to the cryogenic vessel having a pressure capacity that does not satisfy (e.g., is less than) the pressure capacity threshold.

In the illustrated example of FIG. 4, the cryo-compressed hydrogen production control circuitry 202 controls a position of the flow direction control valve 402 based on a pressure capacity of the cryogenic vessel 102 that is in fluid connection with the hydrogen conduit(s) 205. For example, in response to receiving an indication of the pressure capacity associated with the cryogenic vessel satisfying the pressure capacity threshold, the cryo-compressed hydrogen production control circuitry 202 causes the flow direction control valve 402 to be in a first position that blocks the second portion 406 of the hydrogen conduit(s) 205 and causes the cryo-compressed hydrogen to flow through the first portion 404. Further, in response to receiving an indication of the pressure capacity associated with the cryogenic vessel not satisfying the pressure capacity threshold, the cryo-compressed hydrogen production control circuitry 202 causes the flow direction control valve 402 to be in a second position that blocks the first portion 404 of the hydrogen conduit(s) 205 and causes the cryo-compressed hydrogen to flow through the second portion 406. Thus, the cryo-compressed hydrogen production system 400 of FIG. 4 can be utilized to supply cryo-compressed hydrogen to different cryogenic vessels that have different pressure capacities.

Figure 5:
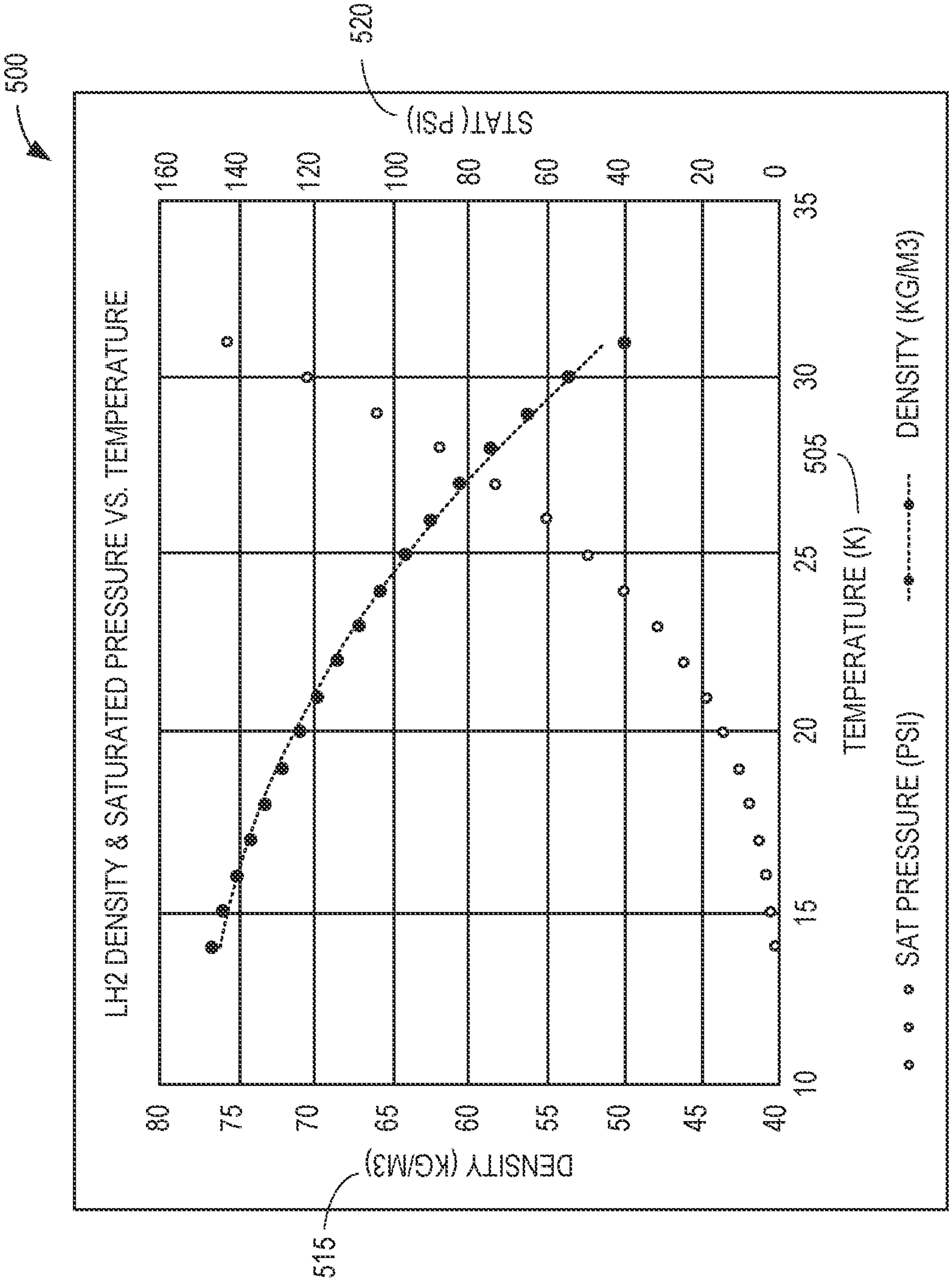
FIG. 5 is a graphical depiction of example data associated with effects of temperature on cryo-compressed hydrogen density and saturated pressure.

FIG. 5 is a graphical depiction of example data 500 associated with effects of temperature on liquid hydrogen density and saturated pressure. As previously described, cryo-compressed hydrogen can have a density similar to that of liquid hydrogen. The density of cryo-compressed hydrogen as a function of pressure is shown at different temperatures in connection with FIG. 6. FIG. 5 includes a thermodynamic relationship of temperature 505 versus density 515 and temperature 505 versus saturated pressure 520 for liquid hydrogen. The thermodynamic properties of liquid hydrogen shown in FIG. 5 can be used to determine a target density for the cryo-compressed hydrogen that matches the density of liquid hydrogen and, thus, enables the same mass of cryo-compressed hydrogen and liquid hydrogen to be stored in a same size vessel. For example, as shown in connection with FIG. 6, the density of liquid hydrogen at 25 Kelvin (K) is 64.2 kg/m$^3$. The same density can be achieved with cryo-compressed hydrogen at a temperature of 34 Kelvin and a pressure of 65 bar, at a temperature of 40 Kelvin and a pressure of 100 bar, at a temperature of 80 Kelvin and a pressure of 350 bar, and/or at a temperature of 100 Kelvin and a pressure of 497 bar. As such, cryo-compressed hydrogen can be stored at cryogenic temperatures in the range of 34-100 Kelvin.

Figure 6:
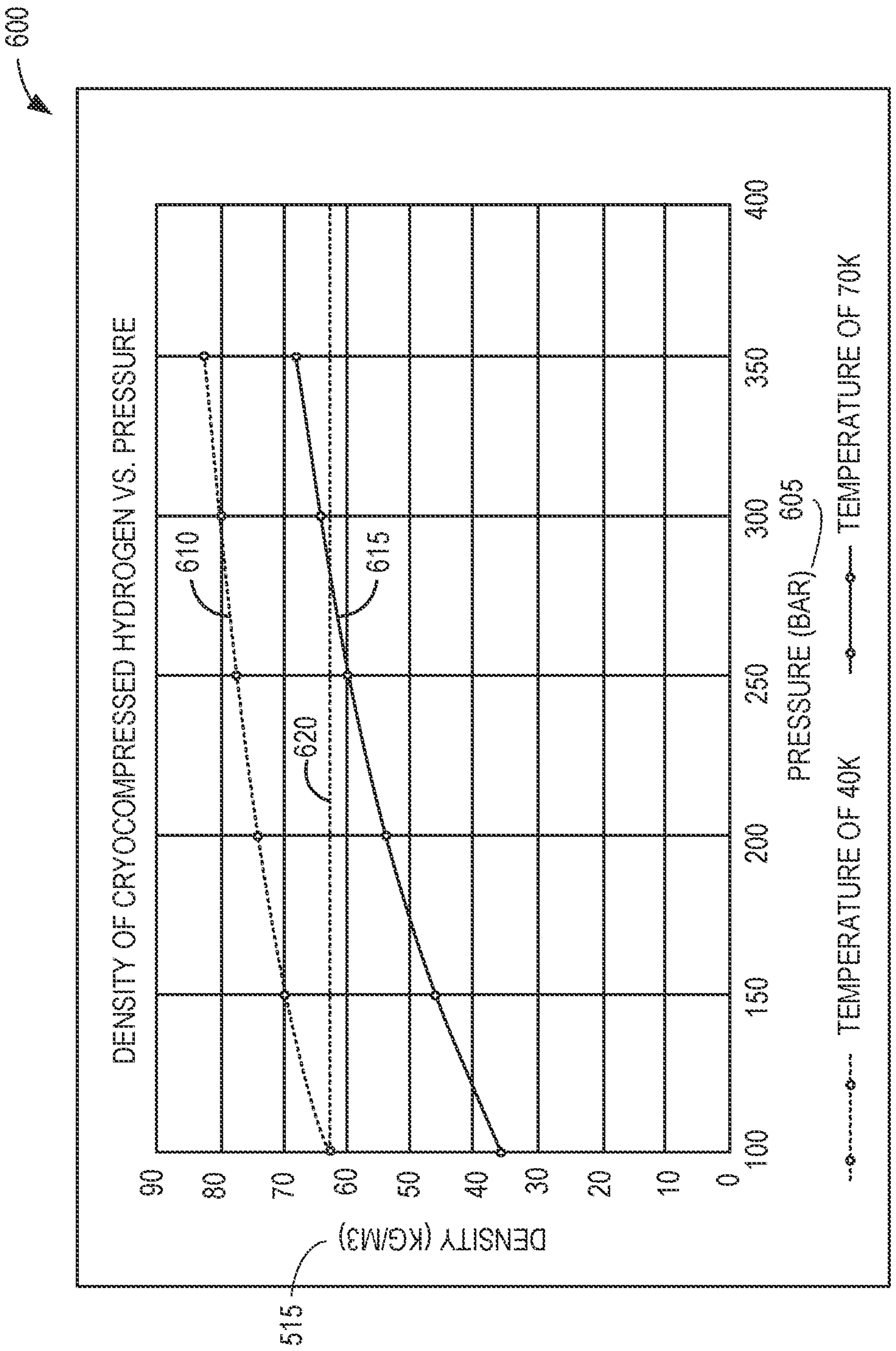
FIG. 6 is a graphical depiction of example data associated with effects of pressure on cryo-compressed hydrogen density.

FIG. 6 is a graphical depiction of example data 600 associated with effects of pressure 605 on the density 515 of cryo-compressed hydrogen at various temperatures, illustrating the thermodynamic properties of cryo-compressed hydrogen. The data 600 includes a first thermodynamic relationship 610 of cryo-compressed hydrogen to represent density (kg/m$^3$) as a function of pressure (bar) at a temperature of 40 K and a second thermodynamic relationship 615 of cryo-compressed hydrogen to represent density (kg/m$^3$) as a function of pressure (bar) at a temperature of 70 K. The data 600 also includes a reference line 620 to demonstrate the effect of temperature on the density of cryo-compressed hydrogen. For example, cryo-compressed hydrogen at a temperature of 70 K and a pressure of 300 bar has a density of 63.7 kg/m$^3$, and cryo-compressed hydrogen at 40 K and a pressure of 100 bar also has a density of 63.4 kg/m$^3$. For example, when the cryo-compressed hydrogen production system 300, 400 of FIGS. 3-4 produce the cryo-compressed hydrogen at 40 K, the cryogenic vessel 102 has an internal volume of 20 m$^3$. When the aircraft 104 relies on 1200 kg of cryo-compressed hydrogen fuel for an intended flight, the cryogenic vessel 102 can be designed with an internal pressure limit of 100 bar. When the cryo-compressed hydrogen production system 300, 400 of FIGS. 3-4 produce the cryo-compressed hydrogen at 70 K with the same cryogenic vessel 102 and the same mass of cryo-compressed hydrogen, then the cryogenic vessel 102 can be designed with an internal pressure limit of 300 bar. In some examples, the cryogenic vessel 102 includes more material (e.g., aluminum, steel, carbon fiber, etc.) to structurally facilitate containment of the potentially higher pressures.

Figure 7:
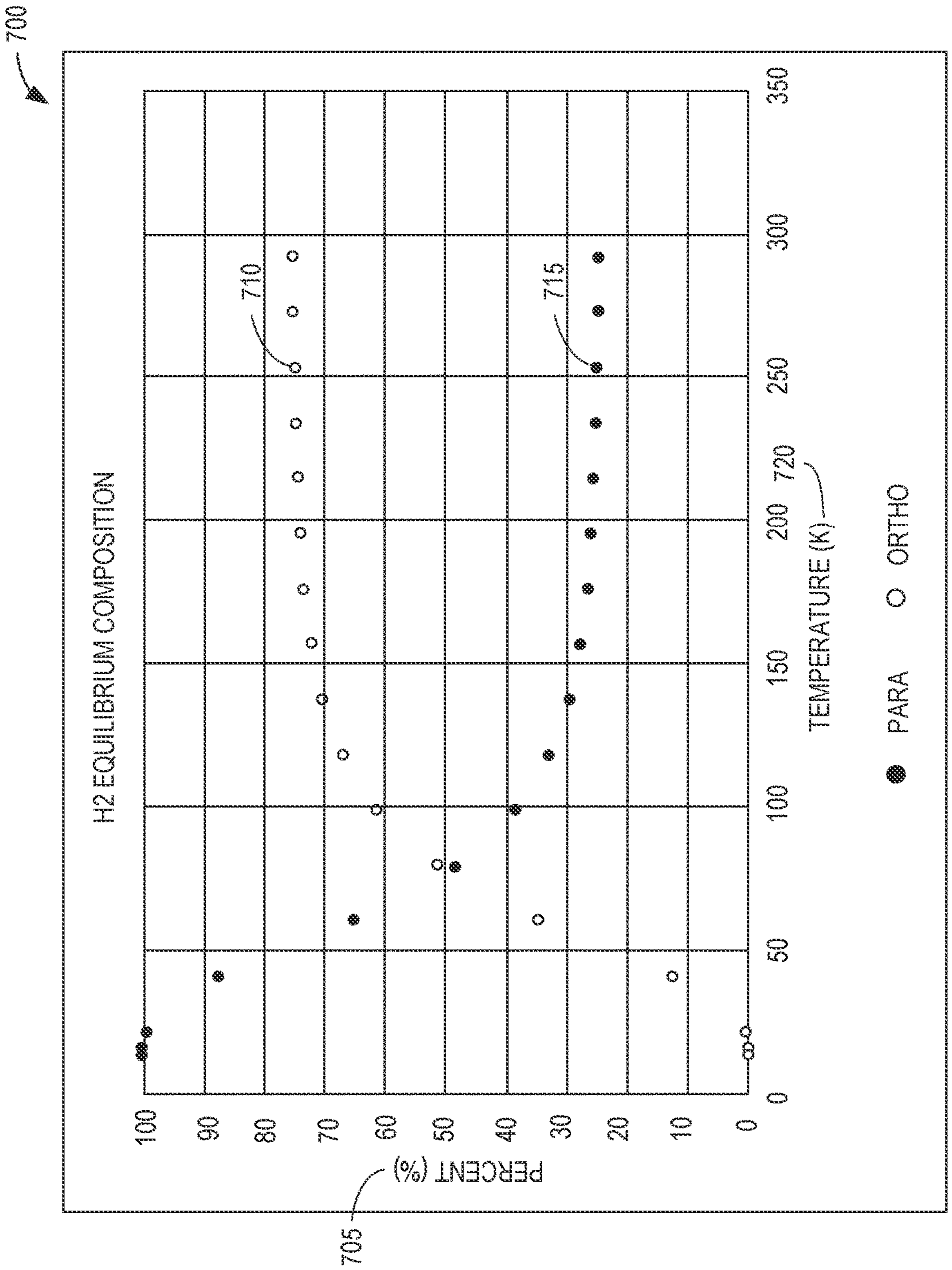
FIG. 7 is a graphical depiction of example data associated with effects of temperature on cryo-compressed hydrogen percentage composition.

FIG. 7 is a graphical depiction of data 700 associated with example hydrogen equilibrium ratios (e.g., a para-ortho ratio) at various temperatures. The data includes a percentage composition 705 of orthohydrogen 710 and parahydrogen 715 as a function of temperature 720. For example, at liquid temperatures (e.g., approximately 25 K) the liquid hydrogen is stabilized (e.g., hydrogen equilibrium is reached) at 99% parahydrogen 715 and 1% orthohydrogen, which requires a catalyst to convert 98.7% of the orthohydrogen obtained during the liquid production process to parahydrogen. Further, at a cryogenic temperature of 40 K, the cryo-compressed hydrogen is stabilized at 87% parahydrogen 715 and 13% orthohydrogen 710, which enables the catalyst 226 to convert 83% of the orthohydrogen obtained after compression and cooling to parahydrogen to stabilize the cryo-compressed hydrogen. Further, at a cryogenic temperature of 80 K, the cryo-compressed hydrogen is stabilized at 49% parahydrogen 715 and 51% orthohydrogen 710, which enables the catalyst to convert 32% of the orthohydrogen obtained after compression and cooling to parahydrogen to stabilize the cryo-compressed hydrogen. Thus, the cryo-compressed hydrogen production systems 200, 300, 400 of FIGS. 2-4 require a reduced amount of work from the catalyst 226 to stabilize the cryo-compressed hydrogen relative to liquid hydrogen production.

Figure 8:
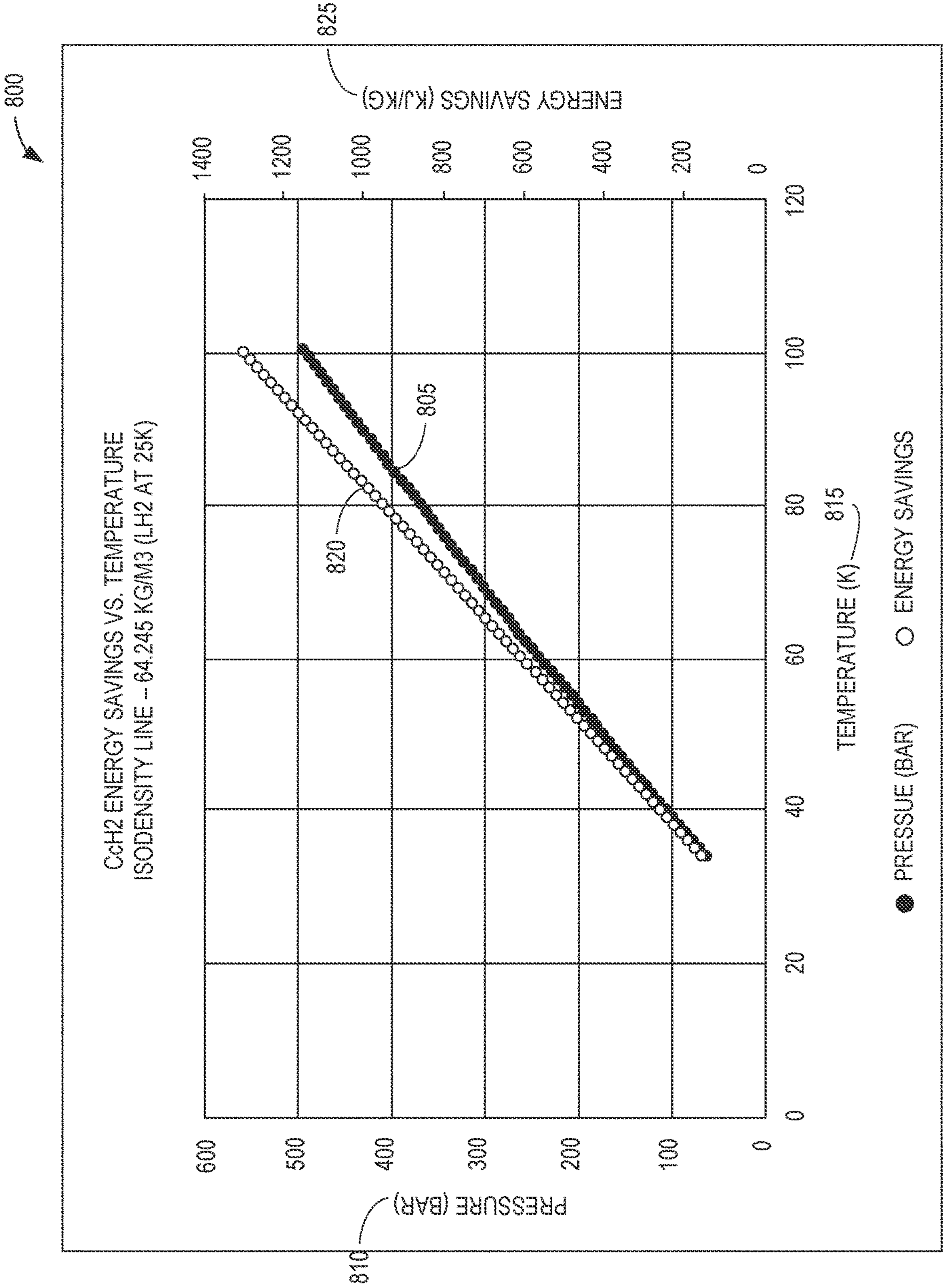
FIG. 8 is a graphical depiction of example data associated with energy savings provided by the cryo-compressed hydrogen production systems of FIGS. 2-4.

FIG. 8 is a graphical depiction of data 800 associated with example energy savings obtained through the production of cryo-compressed hydrogen as opposed to liquid hydrogen. The data 800 includes an example temperature-pressure relationship 805 that represents the cryo-compressed hydrogen as a function of pressure (bar) 810 and temperature (K) 815. That is, the temperature-pressure relationship 805 is indicative of the corresponding temperatures and pressures at which the cryo-compressed hydrogen is produced to obtain the same density as liquid hydrogen. Further, the data 800 includes an example temperature-energy savings relationship 820 that represents an amount of energy savings (kJ/kg) 825 obtained through the production of the cryo-compressed hydrogen as a function of the temperature 815. As shown, over 100 kJ/kg of energy is saved by producing the cryo-compressed hydrogen at 34 K and 65 bar, and over 1200 kJ/kg of energy is saved by producing the cryo-compressed hydrogen at 100 K and 497 bar.

In some examples, the cryo-compressed hydrogen production system 200, 300, 400 includes means for compressing hydrogen. In such examples, the means for compressing can be implemented by a multi-stage diaphragm compressor and/or a multi-stage piston compressor. For example, the means for compressing may be implemented by the compressor 208 of FIG. 2.

In some examples, the cryo-compressed hydrogen production system 200, 300, 400 includes means for cooling the hydrogen to a temperature between a first threshold and a second threshold. In such examples, the first threshold is defined by an upper temperature limit for cryo-compressed hydrogen, and the second threshold is greater than a hydrogen liquefaction temperature. In some examples, the first threshold is 100 K and the second threshold is 34 K. In some examples, the first threshold and the second threshold depend on a pressure of the hydrogen. For example, the first threshold and the second threshold decrease in response to the pressure of the hydrogen decreasing. In some examples, the means for cooling is implemented by the first heat exchanger 216, the second heat exchanger 218, the third heat exchanger 220, and/or the expansion valve 302.

In some examples, the cryo-compressed hydrogen production system 200, 300, 400 includes means for transporting the hydrogen to a storage vessel at the temperature. For example, the means for transporting may be implemented by the hydrogen conduit(s) 205. In such examples, the hydrogen conduit(s) 205 transport the hydrogen in a cryo-compressed state to the cryogenic vessel 102 aboard the aircraft 104.

In some examples, the cryo-compressed hydrogen production system 200, 300, 400 includes means for directing the hydrogen through a first portion of the means for transporting or a second portion of the means for transporting. For example, the means for directing may be implemented by the flow direction control valve 402.

In some examples, the cryo-compressed hydrogen production system 200, 300, 400 includes means for controlling at least one of the means for compressing, the means for cooling, or the means for directing based on a pressure capacity of the storage vessel. For example, the means for controlling may be implemented by the cryo-compressed hydrogen production control circuitry 202. In some examples, the cryo-compressed hydrogen production control circuitry 202 may be instantiated by processor circuitry such as the example processor circuitry 1212 of FIG. 12. For instance, the cryo-compressed hydrogen production control circuitry 202 may be instantiated by an example microprocessor executing machine executable instructions such as those implemented by at least blocks 906, 908, 910, 912, 914, 1006, 1008, 1010, 1012, 1014, 1106, 1108, 1110, 1112, 1114, 1116, 1118, 1120 of FIGS. 9-11, as described in further detail herein. In some examples, the cryo-compressed hydrogen production control circuitry 202 may be instantiated by hardware logic circuitry, which may be implemented by an ASIC, XPU, or FPGA circuitry structured to perform operations corresponding to the machine readable instructions. Additionally or alternatively, the cryo-compressed hydrogen production control circuitry 202 may be instantiated by any other combination of hardware, software, and/or firmware. For example, the cryo-compressed hydrogen production control circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example cryo-compressed hydrogen production control circuitry 202 can be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs).

Figure 9:
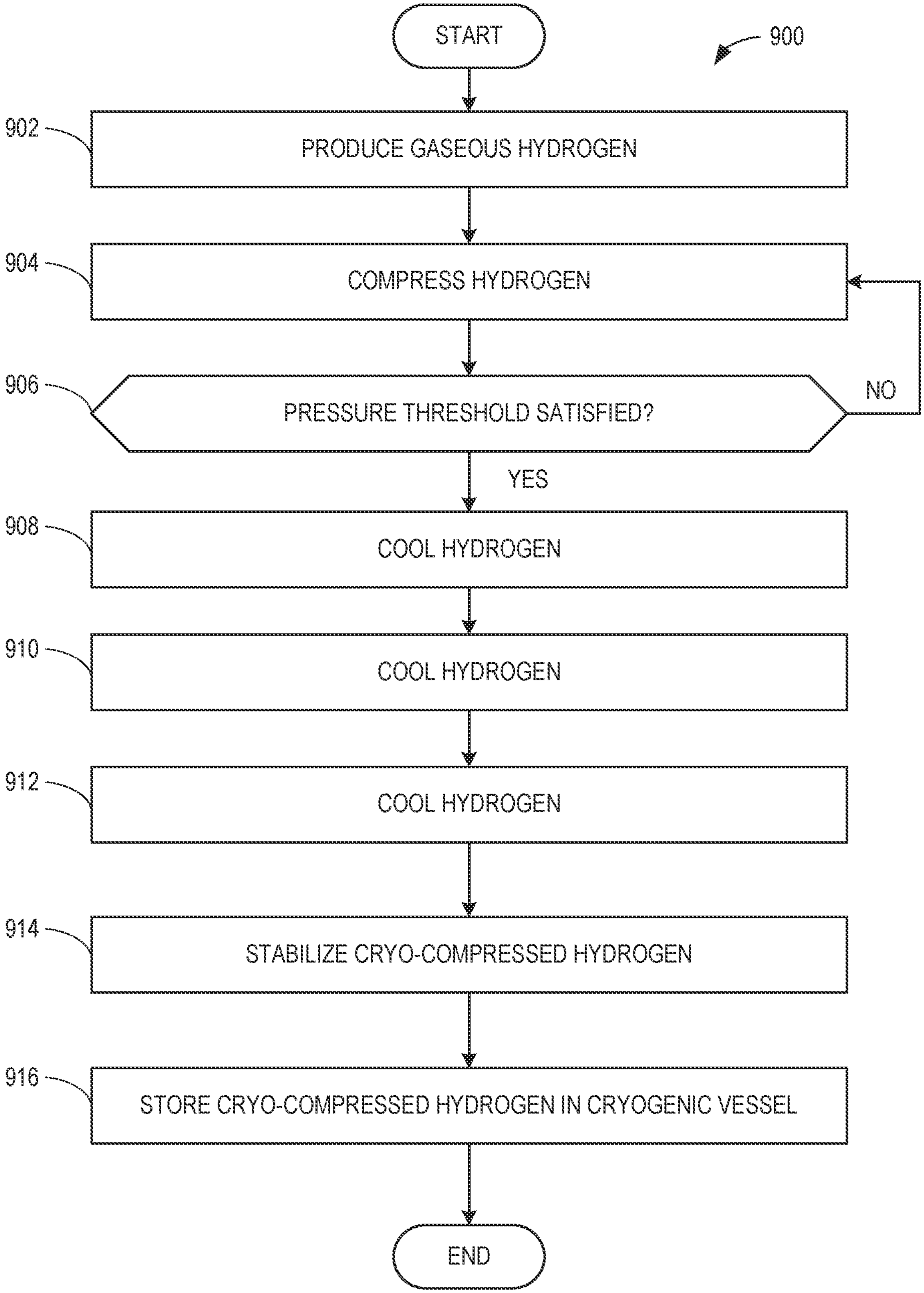
FIG. 9 is a flowchart representative of example machine readable instructions and/or example operations that may be executed by example processor circuitry to implement example cryo-compressed hydrogen production control circuitry of FIG. 2.
Figure 10:
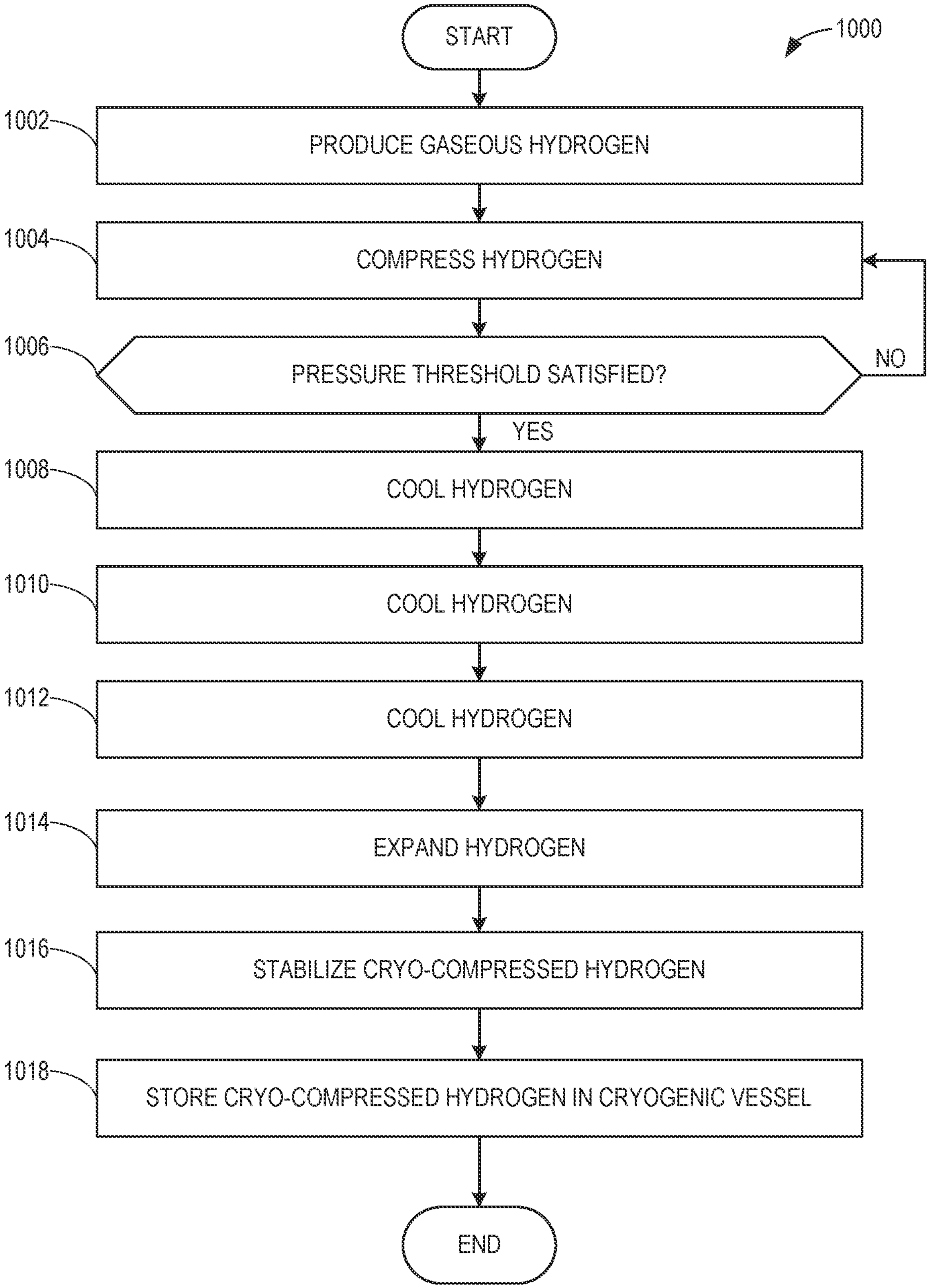
FIG. 10 is a flowchart representative of example machine readable instructions and/or example operations that may be executed by example processor circuitry to implement example cryo-compressed hydrogen production control circuitry of FIG. 3.
Figure 11:
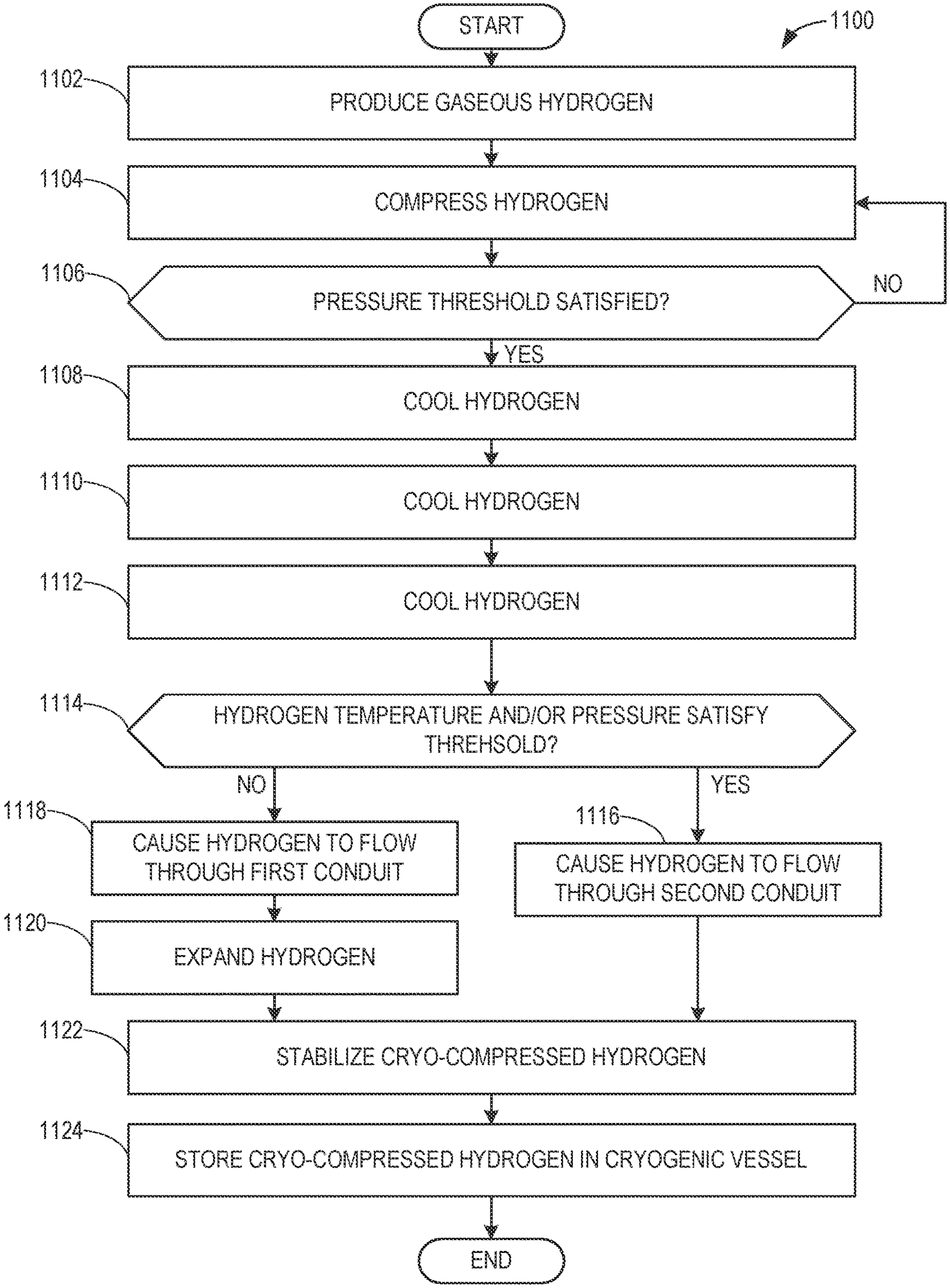
FIG. 11 is a flowchart representative of example machine readable instructions and/or example operations that may be executed by example processor circuitry to implement example cryo-compressed hydrogen production control circuitry of FIG. 4.

A flowchart representative of example machine readable instructions, which may be executed to configure processor circuitry to implement the cryo-compressed hydrogen production control circuitry 202 of FIGS. 2-4, is shown in FIG. 9-11. The machine readable instructions may be one or more executable programs or portion(s) of an executable program for execution by processor circuitry, such as the processor circuitry 1212 shown in the example processor platform 1200 discussed below in connection with FIG. 12. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 9-11, many other methods of implementing the example cryo-compressed hydrogen production control circuitry 202 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9-11 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

FIG. 9 is a flowchart representative of example machine readable instructions and/or example operations 900 that may be executed and/or instantiated by processor circuitry to produce cryo-compressed hydrogen at temperatures greater than or equal to 80 K using the cryo-compressed hydrogen production system 200 of FIG. 2. The machine readable instructions and/or the operations 900 of FIG. 9 begin at block 902, at which the cryo-compressed hydrogen production system 200 produces gaseous hydrogen. For example, the hydrogen input generator 204 (FIGS. 2-4) forms the gaseous hydrogen. In some examples, the cryo-compressed hydrogen production control circuitry 202 (FIGS. 2-4) controls a rate at which the hydrogen input generator 204 forms the hydrogen. For example, the cryo-compressed hydrogen production control circuitry 202 determines the rate at which the hydrogen input generator 204 is to produce the gaseous hydrogen based on a temperature measurement and/or a pressure measurement from the first sensor(s) 212 (FIGS. 2-4) and the third sensor(s) 224 (FIGS. 2-4).

At block 904, the cryo-compressed hydrogen production system 200 compresses the gaseous hydrogen. For example, the compressor 208 (FIGS. 2-4) compresses the gaseous hydrogen. In some examples, the cryo-compressed hydrogen production control circuitry 202 control a power input delivered to the compressor 208 and, in turn, controls a pressure output of the compressor 208. In some examples, the cryo-compressed hydrogen production control circuitry 202 controls a position of the valve 214 (FIGS. 2-4) to control the pressure of the gaseous hydrogen. For example, the cryo-compressed hydrogen production control circuitry 202 can cause the valve 214 to be in a closed position to cause the pressure of the hydrogen to build between the compressor 208 and the valve 214 (e.g., in the second buffer tank 210 (FIGS. 2-4)).

At block 906, the cryo-compressed hydrogen production system 200 determines whether a pressure threshold is satisfied. For example, the cryo-compressed hydrogen production control circuitry 202 accesses a pressure of the hydrogen between the compressor 208 and the valve 214 via the first sensor(s) 212 (FIGS. 2-4). Further, in response to the pressure of the hydrogen satisfying (e.g., being greater than or equal to) the pressure threshold, the cryo-compressed hydrogen production control circuitry 202 causes the valve 214 to open and the operations 900 proceed to block 908. Otherwise, in response to the pressure of the hydrogen not satisfying (e.g., being less than) the pressure threshold, the operations 900 return to block 904 and the compressor 208 continues to increase the pressure of the hydrogen.

At block 908, the cryo-compressed hydrogen production system 200 cools the hydrogen. For example, the first heat exchanger 216 (FIGS. 2-4) cools the hydrogen. In some examples, the first heat exchanger 216 enables thermal energy to be transferred from the hydrogen to water. In some examples, the cryo-compressed hydrogen production control circuitry 202 controls a rate at which the water pump 215 (FIGS. 2-4) drives the water through the first heat exchanger 216 to control an amount of heat that the water absorbs from the hydrogen. In such examples, the second sensor(s) 217 (FIGS. 2-4) measure a temperature and/or a pressure of the hydrogen that exits the first heat exchanger 216. In some examples, the cryo-compressed hydrogen production control circuitry 202 increases the rate at which the water pump 215 drives the water through the first heat exchanger 216 in response to the measured temperature not satisfying (e.g., being greater than) a temperature threshold (e.g., within 5 K of the water).

At block 910, the cryo-compressed hydrogen production system 200 cools the hydrogen. For example, the second heat exchanger 218 (FIGS. 2-4) further cools the hydrogen. In some examples, the second heat exchanger 218 enables thermal energy to be transferred from the hydrogen to gaseous nitrogen.

At block 912, the cryo-compressed hydrogen production system 200 cools the hydrogen. For example, the third heat exchanger 220 (FIGS. 2-4) further cools the hydrogen. In some examples, the third heat exchanger 220 enables thermal energy to be transferred from the hydrogen to liquid nitrogen. As a result, the hydrogen becomes cryo-compressed. To help control the cooling of the hydrogen, the cryo-compressed hydrogen production system 200 controls a mass flow rate of the nitrogen through the second heat exchanger 218 and the third heat exchanger 220. For example, the cryo-compressed hydrogen production control circuitry 202 can control an output of the LN2 pump 222 (FIGS. 2-4) based on a temperature of the hydrogen that the third sensor(s) 224 (FIGS. 2-4) measure downstream of the third heat exchanger 220. Although the operations 900 of FIG. 9 utilize the first heat exchanger 216, the second heat exchanger 218, and the third heat exchanger 220, it should be understood that more or fewer heat exchangers could be utilized to cool the hydrogen and help the hydrogen reach a cryo-compressed form. Thus, the operations 900 of FIG. 9 can be arranged to only utilize one or more of block 908, block 910, or block 912 (or additional blocks beyond those shown) to produce the cryo-compressed hydrogen.

At block 914, the cryo-compressed hydrogen production system 200 stabilizes the hydrogen. For example, the catalyst 226 (FIGS. 2-4) causes an orthohydrogen portion of the hydrogen to convert to parahydrogen.

At block 916, the cryo-compressed hydrogen production system 200 stores the hydrogen in a cryogenic vessel. For example, in response to the hydrogen being stabilized, the hydrogen conduit(s) 205 (FIGS. 2-4) transport the hydrogen in the cryo-compressed form to the cryogenic vessel 102 (FIG. 1) for storage. As such, the cryo-compressed hydrogen can be utilized in a hydrogen-based fuel distribution system to help propel the aircraft 104.

FIG. 10 is a flowchart representative of example machine readable instructions and/or example operations 1000 that may be executed and/or instantiated by processor circuitry to produce cryo-compressed hydrogen at temperatures below 80 K using the cryo-compressed hydrogen production system 300 of FIG. 3. The machine readable instructions and/or the operations 1000 of FIG. 10 begin at block 1002, at which the cryo-compressed hydrogen production system 300 produces gaseous hydrogen. For example, the hydrogen input generator 204 (FIGS. 2-4) forms the gaseous hydrogen. In some examples, the cryo-compressed hydrogen production control circuitry 202 (FIGS. 2-4) controls the rate at which the hydrogen input generator 204 forms the hydrogen. For example, the cryo-compressed hydrogen production control circuitry 202 determines the rate at which the hydrogen input generator 204 is to produce the gaseous hydrogen based on a temperature measurement and/or a pressure measurement from the first sensor(s) 212 (FIGS. 2-4) and the third sensor(s) 224 (FIGS. 2-4).

At block 1004, the cryo-compressed hydrogen production system 300 compresses the gaseous hydrogen. For example, the compressor 208 (FIGS. 2-4) compresses the gaseous hydrogen. In some examples, the cryo-compressed hydrogen production control circuitry 202 control a power input delivered to the compressor 208 and, in turn, controls a pressure output of the compressor 208. In some examples, the cryo-compressed hydrogen production control circuitry 202 controls a position of the valve 214 (FIGS. 2-4) to control the pressure of the gaseous hydrogen. For example, the cryo-compressed hydrogen production control circuitry 202 can cause the valve 214 to be in a closed position to cause the pressure of the hydrogen to build between the compressor 208 and the valve 214 (e.g., in the second buffer tank 210 (FIGS. 2-4)).

At block 1006, the cryo-compressed hydrogen production system 300 determines whether a pressure threshold is satisfied. For example, the cryo-compressed hydrogen production control circuitry 202 accesses a pressure of the hydrogen between the compressor 208 and the valve 214 via the first sensor(s) 212 (FIGS. 2-4). Further, in response to the pressure of the hydrogen satisfying (e.g., being greater than or equal to) the pressure threshold, the cryo-compressed hydrogen production control circuitry 202 causes the valve 214 to open and the operations 900 proceed to block 908. Otherwise, in response to the pressure of the hydrogen not satisfying (e.g., being less than) the pressure threshold, the operations 900 return to block 904 and the compressor 208 continues to increase the pressure of the hydrogen.

At block 1008, the cryo-compressed hydrogen production system 300 cools the hydrogen. For example, the first heat exchanger 216 (FIGS. 2-4) cools the hydrogen. In some examples, the first heat exchanger 216 enables thermal energy to be transferred from the hydrogen to water. In some examples, the cryo-compressed hydrogen production control circuitry 202 controls a rate at which the water pump 215 (FIGS. 2-4) drives the water through the first heat exchanger 216 to control an amount of heat that the water absorbs from the hydrogen. In such examples, the second sensor(s) 217 (FIGS. 2-4) measure a temperature and/or a pressure of the hydrogen that exits the first heat exchanger 216. In some examples, the cryo-compressed hydrogen production control circuitry 202 increases the rate at which the water pump 215 drives the water through the first heat exchanger 216 in response to the measured temperature not satisfying (e.g., being greater than) a temperature threshold (e.g., within 5 K of the water).

At block 1010, the cryo-compressed hydrogen production system 300 cools the hydrogen. For example, the second heat exchanger 218 (FIGS. 2-4) further cools the hydrogen. In some examples, the second heat exchanger 218 enables thermal energy to be transferred from the hydrogen to gaseous nitrogen.

At block 1012, the cryo-compressed hydrogen production system 300 cools the hydrogen. For example, the third heat exchanger 220 (FIGS. 2-4) further cools the hydrogen. In some examples, the third heat exchanger 220 enables thermal energy to be transferred from the hydrogen to liquid nitrogen. As a result, the hydrogen becomes cryo-compressed. To help control the cooling of the hydrogen, the cryo-compressed hydrogen production system 200 controls a mass flow rate of the nitrogen through the second heat exchanger 218 and the third heat exchanger 220. For example, the cryo-compressed hydrogen production control circuitry 202 can control an output of the LN2 pump 222 (FIGS. 2-4) based on a temperature of the hydrogen that the third sensor(s) 224 (FIGS. 2-4) measure downstream of the third heat exchanger 220. Although the operations 1000 of FIG. 10 utilize the first heat exchanger 216, the second heat exchanger 218, and the third heat exchanger 220, it should be understood that additional or fewer heat exchangers could be utilized to cool the hydrogen and help the hydrogen reach a cryo-compressed form. Thus, the operations 1000 of FIG. 10 may utilize one or more of block 1008, block 1010, or block 1012 to produce the cryo-compressed hydrogen.

At block 1014, the cryo-compressed hydrogen production system 300 expands the hydrogen. For example, the expansion valve 302 (FIGS. 3-4) causes the hydrogen to expand to reduce the temperature and the pressure of the hydrogen. In some examples, the cryo-compressed hydrogen production control circuitry 202 controls the expansion valve based on a pressure and/or a temperature at which the cryo-compressed hydrogen is to be stored (e.g., a pressure and/or temperature capacity associated with the cryogenic vessel 102 (FIG. 1)).

At block 1016, the cryo-compressed hydrogen production system 300 stabilizes the hydrogen. For example, the catalyst 226 (FIGS. 2-4) causes an orthohydrogen portion of the hydrogen to convert to parahydrogen.

At block 1018, the cryo-compressed hydrogen production system 300 stores the hydrogen in a cryogenic vessel. For example, in response to the hydrogen being stabilized, the hydrogen conduit(s) 205 (FIGS. 2-4) transport the hydrogen in the cryo-compressed form to the cryogenic vessel 102 (FIG. 1) for storage. As such, the cryo-compressed hydrogen can be utilized in a hydrogen-based fuel distribution system to help propel the aircraft 104.

FIG. 11 is a flowchart representative of example machine readable instructions and/or example operations 1100 that may be executed and/or instantiated by processor circuitry to produce cryo-compressed hydrogen at temperatures between 34 K and 100 K using the cryo-compressed hydrogen production system 400 of FIG. 4. The machine readable instructions and/or the operations 1100 of FIG. 11 begin at block 1102, at which the cryo-compressed hydrogen production system 400 produces gaseous hydrogen. For example, the hydrogen input generator 204 (FIGS. 2-4) forms the gaseous hydrogen. In some examples, the cryo-compressed hydrogen production control circuitry 202 (FIGS. 2-4) controls the rate at which the hydrogen input generator 204 forms the hydrogen. For example, the cryo-compressed hydrogen production control circuitry 202 determines the rate at which the hydrogen input generator 204 is to produce the gaseous hydrogen based on a temperature measurement and/or a pressure measurement from the first sensor(s) 212 (FIGS. 2-4) and the third sensor(s) 224 (FIGS. 2-4).

At block 1104, the cryo-compressed hydrogen production system 400 compresses the gaseous hydrogen. For example, the compressor 208 (FIGS. 2-4) compresses the gaseous hydrogen. In some examples, the cryo-compressed hydrogen production control circuitry 202 control a power input delivered to the compressor 208 and, in turn, controls a pressure output of the compressor 208. In some examples, the cryo-compressed hydrogen production control circuitry 202 controls a position of the valve 214 (FIGS. 2-4) to control the pressure of the gaseous hydrogen. For example, the cryo-compressed hydrogen production control circuitry 202 can cause the valve 214 to be in a closed position to cause the pressure of the hydrogen to build between the compressor 208 and the valve 214 (e.g., in the second buffer tank 210 (FIGS. 2-4)).

At block 1106, the cryo-compressed hydrogen production system 400 determines whether a pressure threshold is satisfied. For example, the cryo-compressed hydrogen production control circuitry 202 accesses a pressure of the hydrogen between the compressor 208 and the valve 214 via the first sensor(s) 212 (FIGS. 2-4). Further, in response to the pressure of the hydrogen satisfying (e.g., being greater than or equal to) the pressure threshold, the cryo-compressed hydrogen production control circuitry 202 causes the valve 214 to open and the operations 900 proceed to block 908. Otherwise, in response to the pressure of the hydrogen not satisfying (e.g., being less than) the pressure threshold, the operations 900 return to block 904 and the compressor 208 continues to increase the pressure of the hydrogen.

At block 1108, the cryo-compressed hydrogen production system 400 cools the hydrogen. For example, the first heat exchanger 216 (FIGS. 2-4) cools the hydrogen. In some examples, the first heat exchanger 216 enables thermal energy to be transferred from the hydrogen to water. In some examples, the cryo-compressed hydrogen production control circuitry 202 controls a rate at which the water pump 215 (FIGS. 2-4) drives the water through the first heat exchanger 216 to control an amount of heat that the water absorbs from the hydrogen. In such examples, the second sensor(s) 217 (FIGS. 2-4) measure a temperature and/or a pressure of the hydrogen that exits the first heat exchanger 216. In some examples, the cryo-compressed hydrogen production control circuitry 202 increases the rate at which the water pump 215 drives the water through the first heat exchanger 216 in response to the measured temperature not satisfying (e.g., being greater than) a temperature threshold (e.g., within 5 K of the water).

At block 1110, the cryo-compressed hydrogen production system 400 cools the hydrogen. For example, the second heat exchanger 218 (FIGS. 2-4) further cools the hydrogen.

In some examples, the second heat exchanger 218 enables thermal energy to be transferred from the hydrogen to gaseous nitrogen.

At block 1112, the cryo-compressed hydrogen production system 400 cools the hydrogen. For example, the third heat exchanger 220 (FIGS. 2-4) further cools the hydrogen. In some examples, the third heat exchanger 220 enables thermal energy to be transferred from the hydrogen to liquid nitrogen. As a result, the hydrogen becomes cryo-compressed. To help control the cooling of the hydrogen, the cryo-compressed hydrogen production system 200 controls a mass flow rate of the nitrogen through the second heat exchanger 218 and the third heat exchanger 220. For example, the cryo-compressed hydrogen production control circuitry 202 can control an output of the LN2 pump 222 (FIGS. 2-4) based on a temperature of the hydrogen that the third sensor(s) 224 (FIGS. 2-4) measure downstream of the third heat exchanger 220. Although the operations 1100 of FIG. 11 utilize the first heat exchanger 216, the second heat exchanger 218, and the third heat exchanger 220, it should be understood that more or fewer heat exchangers could be utilized to cool the hydrogen and help the hydrogen reach a cryo-compressed form. Thus, the operations 1100 of FIG. 11 may utilize one or more of block 1108, block 1110, or block 1112 to produce the cryo-compressed hydrogen.

At block 1114, the cryo-compressed hydrogen production system 400 determines whether the temperature and/or the pressure of the hydrogen satisfy a temperature threshold and/or a pressure threshold. In some examples, the cryo-compressed hydrogen production control circuitry 202 determines the temperature threshold and/or the pressure threshold based on the temperature and pressure of the hydrogen produced through blocks 1102, 1104, 1106, 1108, 1110, 1112. That is, the cryo-compressed hydrogen production control circuitry 202 determines whether the cryogenic vessel 102 (FIG. 1) can contain the cryo-compressed hydrogen at the temperature and pressure that result from the operations of blocks 1102, 1104, 1106, 1108, 1110, 1112. In some examples, the hydrogen has a temperature greater than or equal to 80 K and a pressure greater than or equal to 350 bar in response to passing through the third heat exchanger 220. In such examples, when the cryogenic vessel 102 has a maximum pressure capacity of greater than or equal to 350 bar, the cryo-compressed hydrogen production control circuitry 202 determines the pressure of the hydrogen satisfies the pressure threshold and causes the operations 1100 to proceed to block 1116. Otherwise, when the cryogenic vessel 102 has a maximum pressure capacity than is less than 350 bar, the cryo-compressed hydrogen production control circuitry 202 determines the pressure of the hydrogen does not satisfy the pressure threshold and causes the operations 1100 to proceed to block 1118.

At block 1116, the cryo-compressed hydrogen production system 400 causes the hydrogen to flow through the second portion 406 (FIG. 4) of the hydrogen conduit(s) 205. For example, the cryo-compressed hydrogen production control circuitry 202 can cause the flow direction control valve 402 (FIG. 4) to be in a first position that blocks the first portion 404 (FIG. 4) of the hydrogen conduit(s) 205 to cause the hydrogen to flow through the second portion 406. As a result, the second portion 406 of the hydrogen conduit(s) 205 transport the hydrogen to the catalyst 226 (FIGS. 2-4) and the operations 1100 proceed to block 1122.

At block 1118, the cryo-compressed hydrogen production system 400 causes the hydrogen to flow through the first portion 404 of the hydrogen conduit(s) 205. For example, the cryo-compressed hydrogen production control circuitry 202 can cause the flow direction control valve 402 to be in a second position that blocks the second portion 406 of the hydrogen conduit(s) 205 to cause the hydrogen to flow through the first portion 404. As a result, the first portion 404 of the hydrogen conduit(s) 205 transport the hydrogen to the expansion valve 302 (FIGS. 3-4).

At block 1120, the cryo-compressed hydrogen production system 400 expands the hydrogen. For example, the expansion valve 302 causes the hydrogen to expand to reduce the temperature and the pressure of the hydrogen. In some examples, the cryo-compressed hydrogen production control circuitry 202 controls the expansion valve based on a pressure and/or a temperature at which the cryo-compressed hydrogen is to be stored (e.g., a pressure and/or temperature capacity associated with the cryogenic vessel 102).

At block 1122, the cryo-compressed hydrogen production system 400 stabilizes the hydrogen. For example, the catalyst 226 causes an orthohydrogen portion of the hydrogen to convert to parahydrogen.

At block 1124, the cryo-compressed hydrogen production system 400 stores the hydrogen in a cryogenic vessel. For example, in response to the hydrogen being stabilized, the hydrogen conduit(s) 205 transport the hydrogen in the cryo-compressed form to the cryogenic vessel 102 for storage. As such, the cryo-compressed hydrogen can be utilized in a hydrogen-based fuel distribution system to help propel the aircraft 104.

Figure 12:
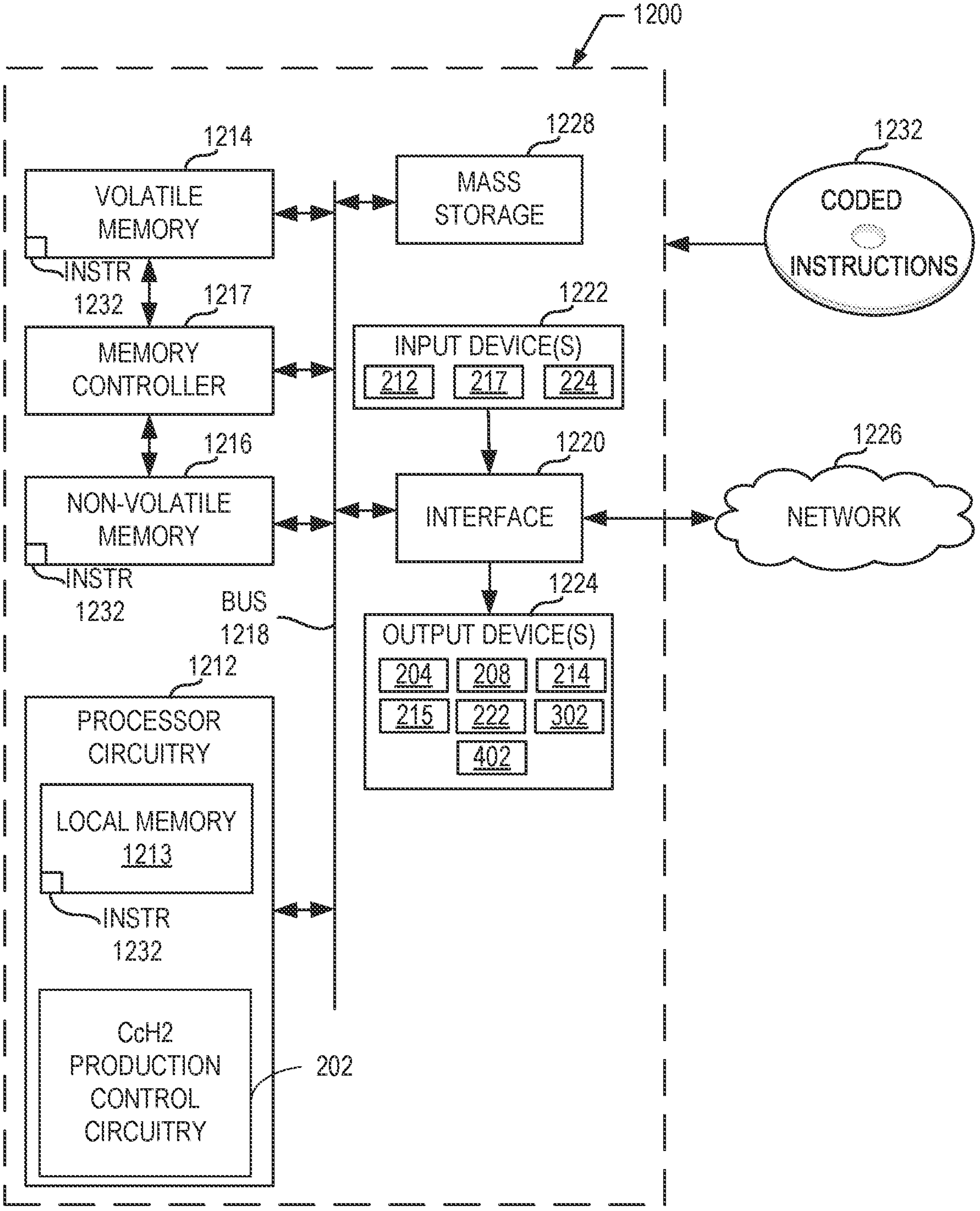
FIG. 12 is a block diagram of an example processing platform including processor circuitry structured to execute the example machine readable instructions and/or the example operations of FIGS. 9-11 to implement the example cryo-compressed hydrogen production control circuitry of FIGS. 2-4.

FIG. 12 is a block diagram of an example processor platform 1200 structured to execute and/or instantiate the machine readable instructions and/or the operations of FIGS. 9-11 to implement the cryo-compressed hydrogen production control circuitry 202 of FIGS. 2-4. The processor platform 1200 can be, for example, a digital computer (e.g., a Full Authority Digital Engine Control (FADEC), an Electronic Engine Control (EEC), an engine control unit (ECU), etc.) or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs, microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the cryo-compressed hydrogen production control circuitry 202.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, a microphone, a keyboard, a button, a mouse, a touchscreen, and/or sensors (e.g., pressure sensors, temperature sensors, flow rate sensors, etc.). In this example, the input device(s) 1222 implement the first sensor(s) 212, the second sensor(s) 217 and the third sensor(s) 224.

One or more output devices 1224 are also connected to the interface circuitry 1220 of the illustrated example. The output device(s) 1224 can be implemented, for example, by an actuator (e.g., a pump actuator, a valve actuator, etc.) and/or an electronic signal generator. In this example, the output device(s) 1224 implement the hydrogen input generator 204, the compressor 208, the valve 214, the water pump 215, the LN2 pump 222, the expansion valve 302, and the flow direction control valve 402. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, HDDs, redundant array of independent disks (RAID) systems, and solid state storage devices such as flash memory devices and/or SSDs.

The machine readable instructions 1232, which may be implemented by the machine readable instructions of FIGS. 9-11, may be stored in the mass storage device 1228, in the volatile memory 1214, in the non-volatile memory 1216, and/or on a removable non-transitory computer readable storage medium such as a CD or DVD.

From the foregoing, it will be appreciated that example systems, methods, apparatus, and articles of manufacture have been disclosed that produce cryo-compressed hydrogen for storage. As such, the example systems, methods, apparatus, and articles of manufacture can save energy consumed to produce the cryo-compressed hydrogen compared to known liquid hydrogen production systems. Additionally, the example systems, methods, apparatus, and articles of manufacture can reduce and/or simplify components utilized to produce the cryo-compressed hydrogen compared to known liquid hydrogen production systems. Furthermore, by storing the hydrogen in the cryo-compressed form as opposed to the liquid form, the example systems, methods, apparatus, and articles of manufacture enable associated fuel distribution systems to be simplified, which can reduce costs and weights of the fuel systems.

Example methods, apparatus, systems, and articles of manufacture to produce cryo-compressed hydrogen are disclosed herein. Further examples and combinations thereof include the following:

Example 1 includes a cryo-compressed hydrogen production system comprising a compressor to compress an input of hydrogen, at least one heat exchanger to cool the hydrogen, and a conduit to convey the hydrogen at least partially to a storage tank for storage at a temperature less than or equal to a first threshold and greater than a second threshold, the first threshold defined by an upper temperature limit for cryo-compressed hydrogen, the second threshold defined by a hydrogen liquefaction temperature.

Example 2 includes the system of any preceding clause, wherein a pressure of the hydrogen is approximately maintained between the compressor and the storage tank.

Example 3 includes the system of any preceding clause, further including an expansion valve operatively coupled to the conduit, the expansion valve to reduce a pressure of the hydrogen and cause the hydrogen to cool.

Example 4 includes the system of any preceding clause, wherein the conduit includes a first conduit and a second conduit in fluid connection with the first conduit, further including an expansion valve operatively coupled to the second conduit, and a valve to cause the hydrogen to flow through the first conduit or the second conduit.

Example 5 includes the system of any preceding clause, wherein in response to the valve causing the first conduit to be in fluid connection with the storage tank, the storage tank receives the hydrogen at a first pressure and the temperature is a first temperature, and in response to the valve causing the second conduit to be in fluid connection with the storage tank, the storage tank receives the hydrogen receives the hydrogen at a second pressure less than the first pressure and the temperature is a second temperature less than the first temperature.

Example 6 includes the system of any preceding clause, wherein the first threshold is less than or equal to 100 Kelvin, and the second threshold is greater than or equal to 34 Kelvin.

Example 7 includes the system of any preceding clause, wherein a pressure of the hydrogen is greater than or equal to 65 bar.

Example 8 includes the system of any preceding clause, wherein up to 100% of the input of the hydrogen is converted to a cryo-compressed state in response to passing through the compressor and the at least one heat exchanger once, the conduit to carry the hydrogen to the storage tank in the cryo-compressed state.

Example 9 includes the system of any preceding clause, wherein the at least one heat exchanger includes at most two fluids.

Example 10 includes the system of any preceding clause, wherein the at least one heat exchanger includes a first heat exchanger to receive the hydrogen downstream of the compressor, the first heat exchanger to cause first thermal energy to be transferred from the hydrogen to water, a second heat exchanger to receive the hydrogen downstream of the first heat exchanger, the second heat exchanger to cause second thermal energy to be transferred from the hydrogen to gaseous nitrogen, and a third heat exchanger to receive the hydrogen downstream of the second heat exchanger, the third heat exchanger to cause third thermal energy to be transferred from the hydrogen to liquid nitrogen, the liquid nitrogen upstream of the gaseous nitrogen.

Example 11 includes the system of any preceding clause, wherein the input is in a gaseous state, further including at least one of a steam methane reformer or an electrolyzer to form the input of the hydrogen.

Example 12 includes the system of any preceding clause, wherein the hydrogen includes orthohydrogen, further including a catalyst downstream of the at least one heat exchanger, the catalyst to covert the orthohydrogen to parahydrogen.

Example 13 includes the system of any preceding clause, wherein the storage tank is a cryogenic vessel on an aircraft.

Example 14 includes a method comprising compressing hydrogen, cooling the hydrogen to a temperature between a first threshold and a second threshold, the first threshold defined by an upper temperature limit for cryo-compressed hydrogen, the second threshold defined by a hydrogen liquefaction temperature, and transporting the hydrogen for storage at the temperature.

Example 15 includes the method of any preceding clause, wherein compressing the hydrogen causes the hydrogen to have a first pressure, further including determining the first pressure based on a pressure drop that the hydrogen encounters during the cooling and a second pressure at which the hydrogen is to be stored.

Example 16 includes the method of any preceding clause, wherein storing the hydrogen includes storing all of the hydrogen that is compressed and cooled.

Example 17 includes the method of any preceding clause, wherein the hydrogen includes orthohydrogen, further including converting the orthohydrogen to parahydrogen.

Example 18 includes the method of any preceding clause, further including directing the hydrogen through a first conduit to cause the temperature to be a first temperature, and directing the hydrogen through a second conduit to cause the temperature to be a second temperature greater than the first temperature.

Example 19 includes an apparatus comprising means for compressing hydrogen, means for cooling the hydrogen to a temperature between a first threshold and a second threshold, the first threshold defined by an upper temperature limit for cryo-compressed hydrogen, the second threshold greater than a hydrogen liquefaction temperature, and means for transporting the hydrogen at least partially to a storage vessel for storage at the temperature.

Example 20 includes the apparatus of any preceding clause, further including means for directing the hydrogen through a first portion of the means for transporting or a second portion of the means for transporting, wherein the temperature is a first temperature in response to the hydrogen being directed through the first portion of the means for transporting, wherein the temperature is a second temperature greater than the first temperature in response to the hydrogen being directed through the second portion of the means for transporting.

Example 21 includes the method of any preceding clause, wherein cooling the hydrogen includes expanding the hydrogen.

Example 22 is a non-transitory machine-readable medium comprising instructions that, when executed, cause processor circuitry to at least cause gaseous hydrogen to be produced; cause the gaseous hydrogen to be compressed; compare a pressure of the gaseous hydrogen to a pressure threshold; and in response to the pressure threshold being satisfied, cause the gaseous hydrogen to be cooled to a temperature between a first temperature threshold and a second temperature threshold to convert the gaseous hydrogen to cryo-compressed hydrogen, the first threshold defined by an upper cryo-compressed hydrogen temperature limit, the second threshold defined by a hydrogen liquefaction temperature, the cryo-compressed hydrogen to be at least one of stabilized or transported for storage at the temperature.

Example 23 is a non-transitory machine-readable medium comprising instructions that, when executed, cause processor circuitry to at least cause gaseous hydrogen to be produced; cause the gaseous hydrogen to be compressed; compare a pressure of the gaseous hydrogen to a pressure threshold; in response to the pressure threshold being satisfied, cause the gaseous hydrogen to be cooled to a temperature between a first temperature threshold and a second temperature threshold to convert the gaseous hydrogen to cryo-compressed hydrogen, the first threshold defined by an upper cryo-compressed hydrogen temperature limit, the second threshold defined by a hydrogen liquefaction temperature; and cause the cryo-compressed hydrogen to expand, the cryo-compressed hydrogen to be at least one of stabilized or transported for storage at the temperature in response to being expanded.

Example 24 is a non-transitory machine-readable medium comprising instructions that, when executed, cause processor circuitry to at least cause gaseous hydrogen to be produced; cause the gaseous hydrogen to be compressed; compare a pressure of the gaseous hydrogen to a pressure threshold; in response to the pressure threshold being satisfied, cause the gaseous hydrogen to be cooled to a first temperature between a first temperature threshold and a second temperature threshold to convert the gaseous hydrogen to cryo-compressed hydrogen, the first threshold defined by an upper cryo-compressed hydrogen temperature limit, the second threshold defined by a hydrogen liquefaction temperature; determine at least one of a storage temperature range or a storage pressure range for the hydrogen based on a vessel in which the cryo-compressed hydrogen is to be stored; in response to at least one of the first temperature being greater than the storage temperature range or a first pressure of the cryo-compressed hydrogen at the first temperature being greater than the storage pressure range, cause the cryo-compressed hydrogen to flow through a first conduit; and cause the cryo-compressed hydrogen to expand and reach at least one of a second temperature within the storage temperature range or a second pressure within the storage pressure range, the cryo-compressed hydrogen to be at least one of stabilized, transported for storage, or transported for use while having at least one of the second temperature or the second pressure in response to flowing through the first conduit; and in response to at least one of the first temperature and the first pressure of the hydrogen being within the storage temperature range or the storage pressure range, cause the cryo-compressed hydrogen to flow through a second conduit, the cryo-compressed hydrogen to be at least one of stabilized, transported for storage, or transported for use while having at least one of the first temperature or the first pressure in response to flowing through the second conduit.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A cryo-compressed hydrogen production system comprising:
a compressor to compress an input of hydrogen;
at least one heat exchanger to cool the hydrogen;
a conduit to convey the hydrogen at least partially to a storage tank for storage at a temperature less than or equal to a first threshold and greater than a second threshold, the first threshold defined by an upper temperature limit for cryo-compressed hydrogen, the second threshold defined by a hydrogen liquefaction temperature;
a buffer tank operatively coupled to the conduit between the compressor and the at least one heat exchanger;
a valve operatively coupled to the conduit between the buffer tank and the at least one heat exchanger; and
processor circuitry configured to cause the valve to block the hydrogen from flowing to the at least one heat exchanger in response to a pressure of the hydrogen in the buffer tank not satisfying a pressure threshold.

2. The system of claim 1, wherein the pressure of the hydrogen is maintained within 20% between the buffer tank and the storage tank.

3. The system of claim 1, further including an expansion valve different from the valve, the expansion valve operatively coupled to the conduit, the expansion valve to reduce the pressure of the hydrogen and cause the hydrogen to cool.

4. The system of claim 1, wherein the conduit includes a first conduit and a second conduit in fluid connection with the first conduit, further including an expansion valve operatively coupled to the second conduit, wherein the valve is to cause the hydrogen to flow through the first conduit or the second conduit.

5. The system of claim 4, wherein in response to the valve causing the first conduit to be in fluid connection with the storage tank, the storage tank receives the hydrogen at a first pressure and the temperature is a first temperature, and, in response to the valve causing the second conduit to be in fluid connection with the storage tank, the storage tank receives the hydrogen receives the hydrogen at a second pressure less than the first pressure and the temperature is a second temperature less than the first temperature.

6. The system of claim 1, wherein the first threshold is less than or equal to 100 Kelvin, and the second threshold is greater than or equal to 34 Kelvin.

7. The system of claim 1, wherein the pressure of the hydrogen is greater than or equal to 65 bar.

8. The system of claim 1, wherein up to 100% of the input of the hydrogen is converted to a cryo-compressed state in response to passing through the compressor and the at least one heat exchanger once, the conduit to carry the hydrogen to the storage tank in the cryo-compressed state.

9. The system of claim 1, wherein the at least one heat exchanger includes at most two fluids.

10. The system of claim 1, wherein the at least one heat exchanger includes:
a first heat exchanger to receive the hydrogen downstream of the compressor, the first heat exchanger to cause first thermal energy to be transferred from the hydrogen to water;
a second heat exchanger to receive the hydrogen downstream of the first heat exchanger, the second heat exchanger to cause second thermal energy to be transferred from the hydrogen to gaseous nitrogen; and
a third heat exchanger to receive the hydrogen downstream of the second heat exchanger, the third heat exchanger to cause third thermal energy to be transferred from the hydrogen to liquid nitrogen, the liquid nitrogen upstream of the gaseous nitrogen.

11. The system of claim 1, wherein the input is in a gaseous state, further including at least one of a steam methane reformer or an electrolyzer to form the input of the hydrogen.

12. The system of claim 1, wherein the hydrogen includes orthohydrogen, the system further including a catalyst downstream of the at least one heat exchanger, the catalyst to covert the orthohydrogen to parahydrogen.

13. The system of claim 1, wherein the storage tank is a cryogenic vessel on an aircraft.

14. A method comprising:
compressing hydrogen;
cooling the hydrogen to a temperature between a first threshold and a second threshold, the first threshold defined by an upper temperature limit for cryo-compressed hydrogen, the second threshold defined by a hydrogen liquefaction temperature; and
transporting the hydrogen for storage at the temperature, including:
directing the hydrogen through a first conduit to cause the temperature to be a first temperature; and
directing the hydrogen through a second conduit to cause the temperature to be a second temperature greater than the first temperature.

15. The method of claim 14, wherein compressing the hydrogen causes the hydrogen to have a first pressure, further including determining the first pressure based on a pressure drop that the hydrogen encounters during the cooling and a second pressure at which the hydrogen is to be stored.

16. The method of claim 14, wherein storing the hydrogen includes storing all of the hydrogen that is compressed and cooled.

17. An apparatus comprising:
means for compressing hydrogen;
means for cooling the hydrogen to a temperature between a first threshold and a second threshold, the first threshold defined by an upper temperature limit for cryo-compressed hydrogen;
means for transporting the hydrogen at least partially to a storage vessel for storage at the temperature; and
means for directing the hydrogen through a first portion of the means for transporting or a second portion of the means for transporting, wherein directing the hydrogen through the first portion of the means for transporting causes the hydrogen to encounter a portion of the means for cooling to cause the temperature to be a first temperature, wherein directing the hydrogen through the second portion of the means for transporting causes the hydrogen to avoid the portion of the means for cooling to cause the temperature to be a second temperature greater than the first temperature.

18. The method of claim 14, wherein the hydrogen includes orthohydrogen, the method further including converting the orthohydrogen to parahydrogen.

19. The method of claim 18, wherein converting the orthohydrogen to the parahydrogen includes converting less than 98.7% of the orthohydrogen to the parahydrogen.

20. The apparatus of claim 17, wherein the second threshold is greater than or equal to 80 Kelvin.

* * * * *